United States Patent
Flodin et al.

(10) Patent No.: US 10,904,147 B1
(45) Date of Patent: Jan. 26, 2021

(54) BOUNDARY CONDITION CHECK USING ASSOCIATIVE MEMORY

(71) Applicant: Arista Networks, Inc., Santa Clara, CA (US)

(72) Inventors: Hans Jonas Flodin, New Westminster (CA); Michael Chih-Yen Wang, Vancouver (CA); Navdeep Bhatia, Sunnyvale, CA (US)

(73) Assignee: Arista Networks, Inc., Santa Clara, CA (US)

(*) Notice: Subject to any disclaimer, the term of this patent is extended or adjusted under 35 U.S.C. 154(b) by 0 days.

(21) Appl. No.: 16/518,804

(22) Filed: Jul. 22, 2019

(51) Int. Cl.
    *H04L 12/743* (2013.01)
    *H04L 29/06* (2006.01)
    *H04L 12/801* (2013.01)
    *H04L 9/14* (2006.01)
    *H04L 1/00* (2006.01)
    *H04L 12/26* (2006.01)

(52) U.S. Cl.
    CPC .......... *H04L 45/7457* (2013.01); *H04L 47/34* (2013.01); *H04L 69/22* (2013.01); *H04L 1/0061* (2013.01); *H04L 1/0063* (2013.01); *H04L 1/0083* (2013.01); *H04L 9/14* (2013.01); *H04L 43/0847* (2013.01); *H04L 63/0428* (2013.01); *H04L 63/123* (2013.01)

(58) Field of Classification Search
None
See application file for complete search history.

(56) References Cited

U.S. PATENT DOCUMENTS

| | | | | |
|---|---|---|---|---|
| 6,157,955 A | * | 12/2000 | Narad | H04L 45/16 709/228 |
| 7,539,750 B1 | * | 5/2009 | Parker | G06F 15/16 709/224 |
| 2006/0187930 A1 | * | 8/2006 | Smith | H04L 45/00 370/392 |
| 2013/0343181 A1 | * | 12/2013 | Stroud | H04L 69/22 370/229 |
| 2013/0347103 A1 | * | 12/2013 | Veteikis | H04L 43/04 726/22 |
| 2018/0332009 A1 | * | 11/2018 | Lange | A61B 5/0022 |
| 2018/0375755 A1 | * | 12/2018 | Joshi | H04L 45/18 |

OTHER PUBLICATIONS

Ravikumar V.C. et al., "TCAM Architecture for IP Lookup Using Prefix Properties," IEEE Computer Society, 0272-1732, Mar.-Apr. 2004, 10 pages.
Rijsinghani, "Computation of the Internet Checksum via Incremental Update," Digital Equipment Corporation, Network Group, Request for Comments: 1624, Updates: 1141, Category: Informational, May 1994, 6 pages.

* cited by examiner

*Primary Examiner* — Anh Vu H Ly
(74) *Attorney, Agent, or Firm* — Haley Guiliano LLP

(57) ABSTRACT

Methods and systems are described for comparing values using an associative memory. An associative memory lookup is performed based on a key that comprises a first number, a second number, and a third number. The associative memory includes sets of mask rows that are configured such that the associative memory returns a result of true when the sum of the first number and the second number is equal to the third number. The result of the associative memory lookup is outputted. The associative memory configured in this manner may be used, for example, by a packet forwarding device to perform a zero-value boundary condition check or packet sequence check.

20 Claims, 21 Drawing Sheets

| C | S | O | Result | Note |
|---|---|---|---|---|
| 0 | 0*************** | 1*************** | False | Bit 15 Inequality Check |
| 0 | 1*************** | 0*************** | False | Bit 15 Inequality Check |
| 0 | *0************** | *1************** | False | Bit 14 Inequality Check |
| 0 | *1************** | *0************** | False | Bit 14 Inequality Check |
| ... | ... | ... | ... | ... |
| 0 | **************0* | **************1* | False | Bit 1 Inequality Check |
| 0 | **************1* | **************0* | False | Bit 1 Inequality Check |
| 0 | ***************0 | ***************1 | False | Bit 0 Inequality Check |
| 0 | ***************1 | ***************0 | False | Bit 0 Inequality Check |
| 0 | **************** | **************** | True | All Bits Equal |

FIG. 2

| | C | S | O | Result | Note |
|---|---|---|---|---|---|
| 302 | 1 | 1111111111111111 | 0000000000000001 | True | All 16 Bits are Perturbed |
| 304 | 1 | 0111111111111111 | 1000000000000000 | True | Bit 15 Inequality Check |
| 306 | 1 | 0*************** | 1*************** | False | Bit 15 Inequality Check |
| 308 | 1 | 1*************** | 0*************** | False | 15 Bits are Perturbed |
| 310 | 1 | *0111111111111111 | *1000000000000000 | True | Bit 14 Inequality Check |
| 312 | 1 | *0************** | *1************** | False | Bit 14 Inequality Check |
| 314 | 1 | *1************** | *0************** | False | 14 Bits Perturbed |
| 316 | 1 | **0111111111111 | **1000000000000 | True | Bit 13 Inequality Check |
| 318 | 1 | 0******** | 1************ | False | Bit 13 Inequality Check |
| 320 | 1 | *1******* | *0*********** | False | ... |
| 322 | 1 | **************01 | **************10 | True | 2 Bits are Perturbed |
| 323 | 1 | **************0* | **************1* | False | Bit 1 Inequality Check |
| 324 | 1 | **************1* | **************0* | False | Bit 1 Inequality Check |
| 326 | 1 | ***************0 | ***************1 | True | 1 Bit is Perturbed |
| 328 | 1 | ***************0 | ***************1 | False | Bit 0 Inequality Check |
| 330 | 1 | ***************1 | ***************0 | False | Bit 0 Inequality Check |
| 332 | 1 | **************** | **************** | False | All Bits Equal |

| | C | S | O | Result | Note |
|---|---|---|---|---|---|
| 402 | 11 | 1111111111111111 | 0000000000000011 | True | All 16 Bits are Perturbed |
| 404 | 11 | 1111111111111110 | 0000000000000010 | True | |
| 406 | 11 | 1111111111111101 | 0000000000000001 | True | |
| 408 | 11 | 0111111111111111 | 1000000000000010 | True | |
| 410 | 11 | 0111111111111110 | 1000000000000001 | True | |
| 412 | 11 | 0111111111111101 | 1000000000000000 | True | |
| 414 | 11 | 0*************** | 1*************** | False | Bit 15 Inequality Check |
| 416 | 11 | 1*************** | 0*************** | False | |
| 418 | 11 | *011111111111111 | *100000000000010 | True | 15 Bits are Perturbed |
| 420 | 11 | *011111111111110 | *100000000000001 | True | |
| 422 | 11 | *011111111111101 | *100000000000000 | True | |
| 424 | 11 | *0************** | *1************** | False | Bit 14 Inequality Check |
| 426 | 11 | *1************** | *0************** | False | |
| 428 | 11 | **01111111111111 | **10000000000010 | True | 14 Bits Perturbed |
| 430 | 11 | **01111111111110 | **10000000000001 | | |
| 432 | 11 | **01111111111101 | **10000000000000 | | |
| 434 | 11 | 0********* | 1************* | False | Bit 13 Inequality Check |
| 436 | 11 | 1********* | 0************* | False | |
| | ... | ... | ... | ... | ... |
| 438 | 11 | *************011 | *************110 | True | 3 Bits are Perturbed |
| 440 | 11 | *************010 | *************101 | True | |
| 442 | 11 | *************001 | *************100 | True | |
| 444 | 11 | ***********0 | ***********1 | False | Bit 3 Inequality Check |
| 446 | 11 | ***********1 | ***********0 | False | |
| 448 | 11 | **************00 | **************11 | True | 2 Bits are Perturbed |
| 450 | 11 | **************0* | **************1* | False | Bit 1 Inequality Check |
| 452 | 11 | **************1* | **************0* | False | |
| 454 | 11 | ***************0 | ***************1 | False | Bit 0 Inequality Check |
| 456 | 11 | ***************1 | ***************0 | False | |
| 458 | 11 | **************** | **************** | False | All Bits Equal |

FIG. 4

| | C | S | O | Result | Note |
|---|---|---|---|---|---|
| 502 | 1 | 1111 | 0001 | True | All 4 Bits are Perturbed |
| 504 | 1 | 0111 | 1000 | True | |
| 506 | 1 | 0*** | 1*** | False | Bit 3 Inequality Check |
| 508 | 1 | 1*** | 0*** | False | |
| 510 | 1 | *011 | *100 | True | 3 Bits are Perturbed |
| 512 | 1 | *0** | *1** | False | Bit 2 Inequality Check |
| 514 | 1 | *1** | *0** | False | |
| 516 | 1 | *01 | **10 | True | 2 Bits are Perturbed |
| 518 | 1 | **0* | **1* | False | Bit 1 Inequality Check |
| 520 | 1 | **1* | **0* | False | |
| 522 | 1 | ***0 | ***1 | True | 1 Bit is Perturbed |
| 524 | 1 | ***0 | ***1 | False | Bit 0 Inequality Check |
| 526 | 1 | ***1 | ***0 | False | |
| 528 | 1 | **** | **** | False | All Bits Equal |

FIG. 5

| | C | S | O | Result |
|---|---|---|---|---|
| 13001 | 100 | 111111111111111 | 000000000000100 | True |
| 13003 | 100 | 111111111111101 | 000000000000010 | True |
| 13005 | *00 | *************1* | *************0* | False |
| 13007 | *00 | *************0* | *************1* | False |
| 13009 | 010 | 111111111111111 | 000000000000010 | True |
| 13011 | 010 | 111111111111110 | 000000000000001 | True |
| 13013 | 100 | 11111111111*0 | 00000000000*1 | True |
| 13015 | **0 | **************1 | **************0 | False |
| 13017 | **0 | **************0 | **************1 | False |
| 13019 | 001 | 111111111111111 | 000000000000001 | True |
| 13021 | 001 | 011111111111111 | 100000000000000 | True |
| 13023 | 010 | 01111111111111* | 10000000000000* | True |
| 13025 | 011 | 111111111111111 | 000000000000011 | True |
| 13027 | 011 | 111111111111110 | 000000000000010 | True |
| 13029 | 011 | 111111111111101 | 000000000000001 | True |
| 13031 | 011 | 011111111111111 | 100000000000010 | True |
| 13033 | 011 | 011111111111110 | 100000000000001 | True |
| 13035 | 011 | 011111111111101 | 100000000000000 | True |
| 13037 | 100 | 0111111111111** | 1000000000000** | True |
| 13039 | 101 | 111111111111111 | 000000000000101 | True |
| 13041 | 101 | 111111111111110 | 000000000000100 | True |
| 13043 | 101 | 111111111111101 | 000000000000011 | True |
| 13045 | 101 | 111111111111100 | 000000000000010 | True |
| 13047 | 101 | 111111111111011 | 000000000000001 | True |
| 13049 | 101 | 011111111111111 | 100000000000100 | True |
| 13051 | 101 | 011111111111110 | 100000000000011 | True |
| 13053 | 101 | 011111111111101 | 100000000000010 | True |
| 13055 | 101 | 011111111111100 | 100000000000001 | True |
| 13057 | 101 | 011111111111011 | 100000000000000 | True |
| 13059 | *** | 1************** | 0************** | False |

FIG. 13

| | C | S | O | Result |
|---|---|---|---|---|
| 13061 | *** | 0************** | 1************** | False |
| 13063 | 001 | *01111111111111 | *10000000000000 | True |
| 13065 | 010 | *0111111111111* | *1000000000000* | True |
| 13067 | 011 | *01111111111111 | *10000000000010 | True |
| 13069 | 011 | *01111111111110 | *10000000000001 | True |
| 13071 | 011 | *01111111111101 | *10000000000000 | True |
| 13073 | 100 | *011111111111** | *100000000000** | True |
| 13075 | 101 | *01111111111111 | *10000000000100 | True |
| 13077 | 101 | *01111111111110 | *10000000000011 | True |
| 13079 | 101 | *01111111111101 | *10000000000010 | True |
| 13081 | 101 | *01111111111100 | *10000000000001 | True |
| 13083 | 101 | *01111111111011 | *10000000000000 | True |
| 13085 | *** | *1************* | *0************* | False |
| 13087 | *** | *0************* | *1************* | False |
| 13089 | 001 | **0111111111111 | **1000000000000 | True |
| 13091 | 010 | **011111111111* | **100000000000* | True |
| 13093 | 011 | **0111111111111 | **1000000000010 | True |
| 13095 | 011 | **0111111111110 | **1000000000001 | True |
| 13097 | 011 | **0111111111101 | **1000000000000 | True |
| 13099 | 100 | 01111111111 | 10000000000 | True |
| 13101 | 101 | **0111111111111 | **1000000000100 | True |
| 13103 | 101 | **0111111111110 | **1000000000011 | True |
| 13105 | 101 | **0111111111101 | **1000000000010 | True |
| 13107 | 101 | **0111111111100 | **1000000000001 | True |
| 13109 | 101 | **0111111111011 | **1000000000000 | True |
| 13111 | * | 1********** | 0************ | False |
| 13113 | * | 0********** | 1************ | False |
| 13115 | 001 | ***011111111111 | ***100000000000 | True |
| 13117 | 010 | ***01111111111* | ***10000000000* | True |
| 13119 | 011 | ***011111111111 | ***100000000010 | True |

FIG. 13 (Cont...)

| | C | S | O | Result |
|---|---|---|---|---|
| 13121 | 011 | ***0111111111110 | ***1000000000001 | True |
| 13123 | 011 | ***0111111111101 | ***1000000000000 | True |
| 13125 | 100 | *01111111111 | *10000000000 | True |
| 13127 | 101 | ***0111111111111 | ***1000000000100 | True |
| 13129 | 101 | ***0111111111110 | ***1000000000011 | True |
| 13131 | 101 | ***0111111111101 | ***1000000000010 | True |
| 13133 | 101 | ***0111111111100 | ***1000000000001 | True |
| 13135 | 101 | ***0111111111011 | ***1000000000000 | True |
| 13137 | * | *1********* | *0*********** | False |
| 13139 | * | *0********* | *1*********** | False |
| 13141 | 001 | ****01111111111 | ****100000000000 | True |
| 13143 | 010 | ****01111111111* | ****10000000000* | True |
| 13145 | 011 | ****01111111111 | ****100000000010 | True |
| 13147 | 011 | ****011111111110 | ****100000000001 | True |
| 13149 | 011 | ****011111111101 | ****100000000000 | True |
| 13151 | 100 | **0111111111 | **1000000000 | True |
| 13153 | 101 | ****01111111111 | ****100000000100 | True |
| 13155 | 101 | ****011111111110 | ****100000000011 | True |
| 13157 | 101 | ****011111111101 | ****100000000010 | True |
| 13159 | 101 | ****011111111100 | ****100000000001 | True |
| 13161 | 101 | ****011111111011 | ****100000000000 | True |
| 13163 | * | 1******* | 0******** | False |
| 13165 | * | 0******* | 1******** | False |
| 13167 | 001 | *****01111111111 | *****10000000000 | True |
| 13169 | 010 | *****0111111111* | *****1000000000* | True |
| 13171 | 011 | *****01111111111 | *****10000000010 | True |
| 13173 | 011 | *****01111111110 | *****10000000001 | True |
| 13175 | 011 | *****01111111101 | *****10000000000 | True |
| 13177 | 100 | ***011111111 | ***100000000 | True |
| 13179 | 101 | *****01111111111 | *****10000000100 | True |

FIG. 13 (Cont...)

| C | S | O | Result |
|---|---|---|---|
| 101 | *****01111111110 | *****10000000011 | True |
| 101 | *****01111111101 | *****10000000010 | True |
| 101 | *****01111111100 | *****10000000001 | True |
| 101 | *****01111111011 | *****10000000000 | True |
| * | *1****** | *0******** | False |
| * | *0****** | *1******** | False |
| 001 | ******0111111111 | ******1000000000 | True |
| 010 | ******011111111* | ******100000000* | True |
| 011 | ******0111111111 | ******1000000010 | True |
| 011 | ******0111111110 | ******1000000001 | True |
| 011 | ******0111111101 | ******1000000000 | True |
| 100 | ****01111111 | ****10000000 | True |
| 101 | ******0111111111 | ******1000000100 | True |
| 101 | ******0111111110 | ******1000000011 | True |
| 101 | ******0111111101 | ******1000000010 | True |
| 101 | ******0111111100 | ******1000000001 | True |
| 101 | ******0111111011 | ******1000000000 | True |
| * | **1***** | **0******* | False |
| * | **0***** | **1******* | False |
| 001 | *******011111111 | *******100000000 | True |
| 010 | *******01111111* | *******10000000* | True |
| 011 | *******011111111 | *******100000010 | True |
| 011 | *******011111110 | *******100000001 | True |
| 011 | *******011111101 | *******100000000 | True |
| 100 | *****0111111 | *****1000000 | True |
| 101 | *******011111111 | *******100000100 | True |
| 101 | *******011111110 | *******100000011 | True |
| 101 | *******011111101 | *******100000010 | True |
| 101 | *******011111100 | *******100000001 | True |
| 101 | *******011111011 | *******100000000 | True |

FIG. 13 (Cont...)

| C | S | O | Result |
|---|---|---|---|
| * | ***1**** | ***0****** | False |
| * | ***0**** | ***1****** | False |
| 001 | *******01111111 | *******10000000 | True |
| 010 | *******0111111* | *******1000000* | True |
| 011 | *******01111111 | *******10000010 | True |
| 011 | *******01111110 | *******10000001 | True |
| 011 | *******01111101 | *******10000000 | True |
| 100 | *****011111 | *****100000 | True |
| 101 | *******01111111 | *******10000100 | True |
| 101 | *******01111110 | *******10000011 | True |
| 101 | *******01111101 | *******10000010 | True |
| 101 | *******01111100 | *******10000001 | True |
| 101 | *******01111011 | *******10000000 | True |
| * | ****1*** | ****0***** | False |
| * | ****0*** | ****1***** | False |
| 001 | ********0111111 | ********1000000 | True |
| 010 | ********011111* | ********100000* | True |
| 011 | ********0111111 | ********1000010 | True |
| 011 | ********0111110 | ********1000001 | True |
| 011 | ********0111101 | ********1000000 | True |
| 100 | ******01111 | ******10000 | True |
| 101 | ********0111111 | ********1000100 | True |
| 101 | ********0111110 | ********1000011 | True |
| 101 | ********0111101 | ********1000010 | True |
| 101 | ********0111100 | ********1000001 | True |
| 101 | ********0111011 | ********1000000 | True |
| * | *****1** | *****0**** | False |
| * | *****0** | *****1**** | False |
| 001 | *********011111 | *********100000 | True |
| 010 | *********01111* | *********10000* | True |

FIG. 13 (Cont...)

| | C | S | O | Result |
|---|---|---|---|---|
| 13301 | 011 | *********011111 | *********100010 | True |
| 13303 | 011 | *********011110 | *********100001 | True |
| 13305 | 011 | *********011101 | *********100000 | True |
| 13307 | 100 | *******0111 | *******1000 | True |
| 13309 | 101 | *********011111 | *********100100 | True |
| 13311 | 101 | *********011110 | *********100011 | True |
| 13313 | 101 | *********011101 | *********100010 | True |
| 13315 | 101 | *********011100 | *********100001 | True |
| 13317 | 101 | *********011011 | *********100000 | True |
| 13319 | * | *****1* | *****0*** | False |
| 13321 | * | *****0* | *****1*** | False |
| 13323 | 001 | **********01111 | **********10000 | True |
| 13325 | 010 | **********0111* | **********1000* | True |
| 13327 | 011 | **********01111 | **********10010 | True |
| 13329 | 011 | **********01110 | **********10001 | True |
| 13331 | 011 | **********01101 | **********10000 | True |
| 13333 | 100 | ********011 | ********100 | True |
| 13335 | 101 | **********01111 | **********10100 | True |
| 13337 | 101 | **********01110 | **********10011 | True |
| 13339 | 101 | **********01101 | **********10010 | True |
| 13341 | 101 | **********01100 | **********10001 | True |
| 13343 | 101 | **********01011 | **********10000 | True |
| 13345 | * | ******1 | ******0** | False |
| 13347 | * | ******0 | ******1** | False |
| 12349 | 001 | ***********0111 | ***********1000 | True |
| 13351 | 010 | ***********011* | ***********100* | True |
| 13353 | 011 | ***********0111 | ***********1010 | True |
| 13355 | 011 | ***********0110 | ***********1001 | True |
| 13357 | 011 | ***********0101 | ***********1000 | True |

FIG. 13 (Cont...)

| C | S | O | Result |
|---|---|---|---|
| 100 | **********01 | **********10 | True |
| 101 | ************0111 | ************1100 | True |
| 101 | ************0110 | ************1011 | True |
| 101 | ************0101 | ************1010 | True |
| 101 | ************0100 | ************1001 | True |
| 101 | ************0011 | ************1000 | True |
| * | ********1* | **********0* | False |
| * | ********0* | **********1* | False |
| 001 | ************011 | ************100 | True |
| 010 | ************01* | ************10* | True |
| 011 | ************011 | ************110 | True |
| 011 | ************010 | ************101 | True |
| 011 | ************001 | ************100 | True |
| 100 | **********0 | **********1 | True |
| 101 | ************010 | ************111 | True |
| 101 | ************001 | ************110 | True |
| 101 | ************000 | ************101 | True |
| * | ********1 | **********0 | False |
| * | ********0 | **********1 | False |
| 001 | ************01 | ************10 | True |
| 010 | ************0* | ************1* | True |
| 011 | ************00 | ************11 | True |
| *** | ************1* | ************0* | False |
| *** | ************0* | ************1* | False |
| 001 | ************0 | ************1 | True |
| *** | ************1 | ************0 | False |
| * | ********0 | **********1 | False |
| 000 | *************** | *************** | True |
| *** | *************** | *************** | False |

FIG. 13 (Cont...)

| | C | S | O | Result |
|---|---|---|---|---|
| 1401 | 1 | 1111 | 0000 | True |
| 1403 | 1 | 0111 | 1000 | True |
| 1405 | 1 | 1*** | 0*** | False |
| 1407 | 1 | 0*** | 1*** | False |
| 1409 | 1 | *011 | *100 | True |
| 1411 | 1 | *1** | *0** | False |
| 1413 | 1 | *0** | *1** | False |
| 1415 | 1 | **01 | **10 | True |
| 1417 | 1 | **1* | **0* | False |
| 1419 | 1 | **0* | **1* | False |
| 1421 | 1 | ***0 | ***1 | True |
| 1423 | 1 | ***1 | ***0 | False |
| 1425 | 1 | ***0 | ***1 | False |
| 1427 | 1 | **** | **** | False |

FIG. 14

| | C | S | O | Result |
|---|---|---|---|---|
| 1501 | 1 | 1111 | **** | True |
| 1503 | 1 | 0111 | 0*** | True |
| 1505 | 1 | 1*** | 0*** | True |
| 1507 | 1 | 0*** | 1*** | False |
| 1509 | 1 | *011 | *0** | True |
| 1511 | 1 | *1** | *0** | True |
| 1513 | 1 | *0** | *1** | False |
| 1515 | 1 | **01 | **0* | True |
| 1517 | 1 | **1* | **0* | True |
| 1519 | 1 | **0* | **1* | False |
| 1521 | 1 | ***0 | ***0 | True |
| 1523 | 1 | ***1 | ***0 | True |
| 1525 | 1 | ***0 | ***1 | False |

FIG. 15

BOUNDARY CONDITION CHECK USING ASSOCIATIVE MEMORY

BACKGROUND

The present disclosure relates to using an associative memory to perform a rapid check of whether a sum of two numbers is equal to a third number. In particular, the present disclosure relates to using an associative memory to perform a checksum boundary condition check for a packet checksum update or to verify sequencing of packets.

SUMMARY

Many computing operations require the addition of two numbers and a comparison of the sum to a third. Packet forwarding devices, for example, must perform thousands of checksum updates per second on received packets before those packets are forwarded to their destination. Such operations typically require several cycles of an arithmetic and logic unit (ALU). Reducing the number of cycles required for these operations can therefore greatly increase the performance of such devices. Disclosed herein are various configurations of an associative memory, e.g., a ternary content-addressable memory (TCAM), for rapidly determining whether addition of two numbers (in one's complement arithmetic) would result in a third number. In some embodiments, the associative memory is configured to perform this determination in a single clock cycle of a computing device, such as a packet forwarding device (e.g., a router).

The associative memory described herein performs a memory lookup based on a key that comprises a first number, a second number, and a third number. The associative memory includes, for each respective bit of the second number and each respective bit of the third number, a first set of mask rows comprising encoded combinations of the first number, the second number, and the third number, where a one's complement addition of the first number and the second number perturbs all bits of the second number up to the respective bit of the second number. It also includes, for each respective bit of the second number and each respective bit of the third number, a second set of mask rows comprising encoded combinations of the second number and the third number, wherein the respective bit of the second number and the respective bit of the third number do not match. Operating together, as will be explained in more detail below, the pairs of sets of mask rows enable the associative memory to rapidly output a value of "true" when a sum of the first number and the second number is equal to the third number.

Embodiments are described below where the associative memory is implemented in a packet forwarding device that uses the associative memory to perform checksum updates. In a typical network infrastructure, packet forwarding devices (e.g., routers) often forward packets from a local device to an outside network. While forwarding the packet, a packet forwarding device commonly performs a network address translation (NAT) operation and/or other updates to the packet. For example, the packet forwarding device may need to translate a locally used address to an address in a public address space (e.g., an Internet address) before forwarding that packet to its destination. Packets typically contain checksums (e.g., a one's complement sum that is computed based on the content of the packet) that are used to verify that the packet was not corrupted while in transit. For example, a sender device may compute a checksum that is included in the packet's header. The recipient device may recompute the checksum and compare it to the checksum in the header of the packet. Matching checksums indicate successful transmission of the packet without corruption.

The packet forwarding device typically performs a NAT operation and/or modifies the packet in other ways requiring an update to the checksum. But since only a small part of the packet is changed, the packet forwarding device need not fully recompute the checksum. Instead, it performs an incremental checksum update (e.g., as described in Network Working Group RFC 1624, which is hereby incorporated by reference in its entirety). To perform such a checksum update, the packet forwarding device identifies all updates that will contribute to a change in the checksum and calculates a new checksum based on all updates and based on the old checksum, e.g., using a technique described in RFC 1624.

The new checksum will sometimes have a value of 0 in all bit positions. This is often undesirable because an all-zero checksum is generally used to signal to network devices that a checksum was not computed. An all-zero checksum is typically represented as a bit string with a value of 1 in all bit positions (negative 0 in one's complement arithmetic). For this reason, conventional packet forwarding devices need to perform an additional boundary check to verify whether the newly updated checksum is equal to 0. When the boundary condition is found, the packet forwarding device sets all bits of the new checksum to a value of 1. Such a boundary check undesirably introduces a bubble into a pipeline of the packet forwarding device, which may significantly slow down the packet forwarding device. To overcome this problem inherent in conventional packet forwarding devices, various embodiments described below include a packet forwarding device that uses an associative memory to perform a rapid (e.g., one clock cycle) check to verify whether the new checksum is equal to 0.

In some embodiments, the packet forwarding device sums packet updates using two's complement arithmetic hardware to generate a two's complement accumulation value which is inverted to produce a value (S) and to generate a two's complement overflow value (C). The packet forwarding device may then use the associative memory (e.g., a TCAM) to check whether S+C is equal to 0, because such an equality would indicate that an update of 0 with all updates would result in a bit string with a value of 0 in all bit positions.

If the associative memory lookup confirms that S+C is equal to 0, the new checksum is set to have a value of 1 in all bit positions. If S+C is not equal to 0, a regular checksum update is performed to compute the new checksum. Such an approach may be performed simultaneously (and in one clock cycle) with regular checksum computation. In this manner, the boundary condition of the checksum being equal to 0 is handled immediately and does not require extra clock cycles that would introduce a bubble into a pipeline.

Embodiments are also described below where the associative memory is implemented in a network device (e.g., a packet forwarding device) that uses the associative memory to verify sequencing of packets. For example, to determine whether a second packet directly follows a first packet, a network device may quickly check if a sequence number of the first packet plus one is equal to the sequence number of the first packet. In some embodiments, a device may perform both a boundary check and a packet sequencing verification. In one implementation, a single associative memory may be used for a checksum for boundary check and for a packet sequencing verification. In another implementation, a device may have two associative memories or two associative memory partitions, one for the boundary check and another for packet sequencing verification.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an exemplary table that represents a portion of an associative memory configuration, in accordance with some embodiments of the disclosure;

FIG. 3 shows another exemplary table that represents a portion of an associative memory configuration, in accordance with some embodiments of the disclosure;

FIG. 4 shows another exemplary table that represents a portion of an associative memory configuration, in accordance with some embodiments of the disclosure;

FIG. 5 shows yet exemplary table that represents a portion of an associative memory configuration, in accordance with some embodiments of the disclosure;

FIG. 13 shows an exemplary table that represents configuration of an associative memory configuration, in accordance with some embodiments of the disclosure;

FIG. 14 shows another exemplary table that represents a portion of an associative memory configuration, in accordance with some embodiments of the disclosure; and FIG. 15 shows another exemplary table that represents a portion of an associative memory configuration, in accordance with some embodiments of the disclosure;

DETAILED DESCRIPTION

Figure 1:
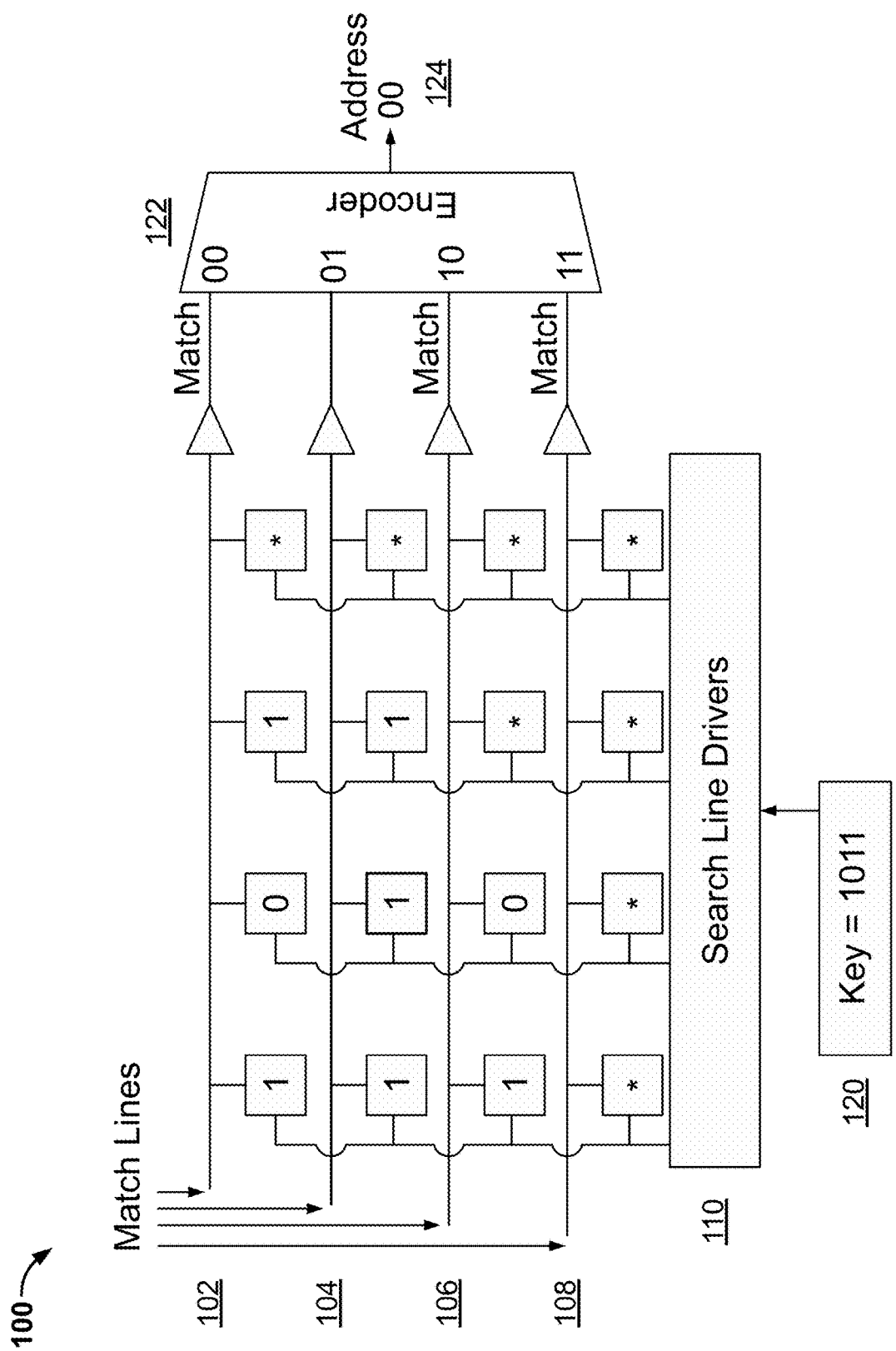
FIG. 1 shows an exemplary associative memory, in accordance with some embodiments of the disclosure.

FIG. 1 shows an exemplary associative memory 100 (e.g., a TCAM), in accordance with some embodiments of the disclosure. Associative memory 100 may be configured to perform an associative memory lookup based on a key 120. The associative memory includes a number of mask rows 102-108 that perform a simultaneous comparison of key 120 to a row of masked bits. In the shown embodiment, the masks of the associative memory 100 may encode a mask of "1," mask of "0," and mask of "don't care" (shown as "*"). Bit mask "1" will check if the respective bit if key 120 is "1," bit mask "0" will check if the respective bit of key 120 is "0," while the mask "*" will result in a successful check regardless of which value the respective bit of key 120 has.

In a single clock cycle, all bits of key 120 may be provided to each search line 102-108 via circuits depicted as vertical lines in FIG. 1. Each search line will perform a bitwise comparison of the respective bit of key 120 to each respective mask. Each line will produce a "match" signal to encoder 122 when all bits of key 120 match each mask of the search line.

Because search lines include "don't care" masks, more than one match signal may be produced. For example, as shown, key 120 has a value of "1011," which results in a match signal being produced by search lines 102, 106, 108.

The match signals are then provided to encoder 122. For example, the encoder may receive a match signal for addresses "00," "10" and "11" of associative memory 100. The encoder may arbitrate between match signals based on priority of the addresses. For example, as shown, lower numbered addresses (shown higher on the figure) have a higher priority than higher numbered addresses (shown lower on the figure). However, any priority scheme may be used. As shown, encoder 122 outputs 124 address of the highest search line that resulted in the match signal (address "00"). In some embodiments, encoder 122 may output a result value associated with the highest priority address that generated a match signal instead of outputting the address number itself.

FIGS. 2-4 show portions of an exemplary table for configuring a portion of an associative memory, in accordance with some embodiments of the disclosure. As shown, columns C, S and O correspond to mask configurations of the associative memory, while column "Result" is associated with a value that is returned by an encoder of the associative memory when the associated mask row produces a match signal. In particular, FIGS. 2-4 show a configuration of an associative memory (e.g., TCAM) of a device (e.g., a packet forwarding device) that can accept values C, S, and O as a key and return the result of "true" when C+S is equal to 0 (using one's complement arithmetic) while encoding values of C are equal to 0, 1, or 3. One skilled in the art would understand that the associative memory can also encode other values of C. Values "1," "0," and "*" shown in FIGS. 2-4 correspond to masks "1," "0," and "don't care."

An associative memory configured in accordance with FIGS. 2-4 performs a comparison of an input key (that includes concatenated values C, S, and O) to each mask row. In some embodiments, the comparisons may be performed in in single clock cycle. That is, each shown mask row (202-218, 302-332, 402-458) is compared to the key and a "match" signal is generated by each mask row that matches the input key. Due to the presence of "don't care" masks, the same key may match more than one mask row. For example, key "1011" may match mask row "1011," mask row "*011," mask row "11," mask row "***" etc. The mask rows that are higher in the table will have a priority higher than mask rows lower in the table. In this way, when multiple matches occur, the associative memory encoded as shown will output a result from a result column that corresponds to the matching mask row with the highest priority (i.e., the match row that is the highest in the table). In other embodiments, the mask rows may be encoded for the lowest row to have the highest priority.

FIG. 2 shows mask rows of an exemplary associative memory configuration that encodes scenarios where C is equal to 0. Since no addition is actually performed when C=0, C+S is equal to O only when S=O. For this reason, mask rows 202-218 encodes a bitwise inequality check between S and O. As shown, mask rows 202 and 204 encode a check for inequality of bit 15 in S and bit 15 in O. That is, mask row 202 encodes a check of bit 15 in S being 0, and bit 15 in O being 1. Mask row 204 similarly encodes a check of bit 15 in O being 0, bit 15 in O being 1. Both mask row 202 and mask row 204 are associated with output result of "false." That is, a key that includes C, S, O would only match mask row 202 or row 204 if C+S=/=O.

Mask rows 206 and 208, similarly encode bit 14 inequality, and so on. Mask rows 210 and 212 similarly encode bit 1 inequality, and mask rows 214 and 216, similarly encode bit 0 inequality. Finally, mask row 218 will have all wild cards and an associated result value of "true", but due to its low priority it will only affect the ultimate output if none of the rows 202-216 matched an inputted key. In this way, mask row 218 encodes a possibility of C+S being equal to O. Consequently, for an input key that includes C that is equal to 0, the portion of the associative memory would be able to, in one cycle, indicate whether or not C+S is equal to O. It should be, that mask rows 202-218 may have any priority as long as they all have a higher priority than mask row 218.

FIG. 3 shows mask rows of an exemplary associative memory configuration (e.g., configuration of a TCAM) that encodes scenarios where C is equal to 1. In this, case, the associative memory is configured to have two sets of mask rows for each respective bit of S and O. In particular, for bit 15 (where bits are numbered from 0) of S and O, the associative memory includes a first set of mask rows (mask rows 302 and 304) that exhaustively encode all combinations of S and O where S+1 is equal to O (in one's complement) and where all 16 bits of S would be perturbed by the addition of C. For example, mask row 302 encodes a situation where S is equal to "1111111111111111" and O is equal to "0000000000000001" because adding "1" to "1111111111111111" would perturb (e.g., flip) all bits of S. Similarly, mask row 304 encodes a situation where S is equal to "0111111111111111" and O is equal to "1000000000000000" because adding "1" to "0111111111111111" would perturb (e.g., flip) all bits of S. This first set of mask rows is associated with a result value of "true" because it encodes situation where S+C is equal to O (in one's complement).

Further, for bit 15 of S and O, the associative memory includes a second set of mask rows (mask rows 306 and 308) that encodes situations where bit 15 of S and bit 15 of O are unequal. This second set of rows is associated with a result value of "false," because it encodes C+S perturbing bit 15, while no such perturbation is expected, since such a perturbation would have been captured by the first set of mask rows (e.g., mask rows 302 and 304). The associative memory is configured such that first set of mask rows for bit 15 have a higher priority than the second set of mask rows for bit 15.

The associative memory may further include two sets of mask rows for each bit of S and O (e.g., bit 14, bit 13 . . . bit 0). For example, the first set of mask rows for bit 14 (mask row 310) exhaustively encodes all combinations of S and O where S+1 is equal to O (in one's complement) and where 15 bits of S would be perturbed by the addition of C. This first set of mask rows is associated with a result value of "true." Similarly, a second set of mask rows for bit 14 (mask rows 312 and 314) encodes situations where bit 14 of S and bit 14 of O are unequal. The associative memory is configured such that sets of mask rows for bit 14 will have a lower priority than both sets of mask rows for bit 15.

The associative memory will similarly include two sets of bit masks for all bits of S and O (bit 13, bit 12 . . . . bit 0), where each next pair of row sets will have a lower priority than earlier sets. Finally, a catchall mask row 332 will have all "don't cares" for S and O, and will have an associated result of "false," because an addition of 1 to S cannot result in S remaining unchanged. Consequently, for an input key that includes C that is equal to 1, the portion of the associative memory shown in FIG. 3 would be able to, in one cycle, indicate whether or not C+S is equal to O.

It should be noted that all values in columns C, S and O of table shown in FIG. 3 may be rotated left by one bit to create mask rows that would encode an additional equality check for all scenarios where C is equal to 2. Similarly, all values in columns C, S and O shown in FIG. 3 may be rotated left by two bits to create mask rows that would encode an additional equality check for all scenarios where C is equal to 4. This technique may be used to encode all situations where C is any power of 2.

FIG. 4 shows mask rows of an exemplary associative memory configuration (e.g., configuration of a TCAM) that encodes scenarios where C is equal to 3. In this, case, the associative memory is configured to have two sets of mask rows for each respective bit of S and O. In particular, for bit 15 of S and O, the associative memory includes a first set of mask rows (mask rows 402-412) that exhaustively encode all combinations of S and O where S+3 is equal to O (in one's complement) and where all 16 bits of S would be perturbed by an addition of 3. For example, mask row 402 encodes a situation where S is equal to "1111111111111111" and O is equal to "0000000000000011" because adding "11" to "1111111111111111" would perturb (e.g., flip) all bits of S. Similarly, mask row 404 encodes a situation where S is equal "1111111111111110" and O is equal to "0000000000000010" because adding "11" to "1111111111111110" would perturb (e.g., flip) all bits of S. This first set of mask rows is associated with a result value of "true" because it encodes situation where S+3 is equal to O (in one's complement).

Further, for bit 15 of S and O, associative memory includes a second set of mask rows (mask rows 414 and 416) that encode situations where bit 15 of S and bit 15 of O are unequal. This second set of rows is associated with a result value of "false," because it encodes C+S perturbing bit 15, while no such perturbation is expected, since such a perturbation would have been captured by the first set of mask rows (e.g., mask rows 402-416). Importantly, the first set of mask rows for bit 15 has a higher priority than the second set of mask rows for bit 15.

The associative memory may further include two sets of mask rows for each bit of S and O (e.g., bit 14, bit 13 . . . bit 0). For example, the first set of mask rows for bit 14 (mask row 418-522) exhaustively encodes all combinations of S and O where S+3 is equal to O (in one's complement) and where 15 bits of S would be perturbed by the addition of 3. This first set of mask rows is associated with a result value of "true." Similarly, a second set of mask rows for bit 14 (mask rows 424 and 426) encodes situations where bit 14 of S and bit 14 of O are unequal. Importantly, both sets of mask rows for bit 14 will have a lower priority than both sets of mask rows for bit 15.

The associative memory will similarly include two sets of bit masks for all bits of S and O (bit 13, bit 12 . . . . bit 0), where each next pair of sets will have a lower priority than earlier sets. Finally, a catchall mask row 458 will have all "don't cares" for S and O, and will have an associated result of "false," because an addition of 3 to S cannot result in S remaining unchanged. Consequently, for an input key that includes C that is equal to 3, the portion of the associative memory shown in FIG. 4 would be able to, in one cycle, indicate whether or not C+S is equal to O.

In some embodiments, the techniques described above may be used to create similar encodings for any values of C. That is, for each bit, the associative memory may have a first set of mask rows that exhaustively check for perturbation, followed by a second set of mask rows that check for inequality.

In some embodiments, the functionality of associative memory shown in FIGS. 2-4 can be achieved using a single associative memory that reuses the mask rows that perform the inequality check for different values of C. One such exemplary configuration of associative memory is shown below with respect to FIG. 13.

While FIGS. 2-4 show examples of encoding for 16 bit values of S and O, an associative memory may be similarly configured for any length of S and O. FIG. 5, for example, shows mask rows of an associative memory (e.g., a TCAM) that encode scenarios where C is equal to 1 for S and O that have length of 4 bits. In this, case, the associative memory is configured to have two sets of mask rows for each respective bit of S and O. In particular, for bit 3 of S and O, the associative memory includes a first set of mask rows (mask rows 502 and 504) that exhaustively encode all combinations of S and O where S+1 is equal to O (in one's complement) and where all 4 bits of S would be perturbed by an addition of 1. For example, mask row 502 encodes a situation where S is equal to "1111" and O is equal "0001" because adding "1" to "11111" would perturb (e.g., flip)" all 4 bits of S. Similarly, mask row 504 encodes a situation where S is equal to "0111" and O is equal to "1000" because adding "1" to "01111" would perturb (e.g., flip)" all 4 bits of S. This first set of mask rows is associated with a result value of "true" because it encodes situation where S+1 is equal to O (in one's complement).

Further, for bit 3 of S and O, the associative memory includes a second set of mask rows (mask rows 506 and 508) that encodes situations where bit 3 of S and bit 3 of O are unequal. This second set of mask rows is associated with a result value of "false," because it encodes C+S perturbing bit 3, while no such perturbation is expected, since such a perturbation would have been captured by the first set of mask rows (e.g., mask rows 502 and 504). Importantly, the first set of mask rows for bit 3 has a higher priority that the second set of mask rows for bit 3.

The associative memory may further include two sets of mask rows for each bit of S and O (e.g., bit 2, 1, and 0). For example, the first set of mask rows for bit 2 (mask row 510) exhaustively encodes all combinations of S and O where S+1 is equal to O (in one's complement) and where 3 bits of S would be perturbed by an addition of 1. This first set of mask rows is associated with a result value of "true." Similarly, a second set of mask rows for bit 2 (mask rows 512 and 514) encodes situations where bit 2 of S and bit 2 of O are unequal. Importantly, sets of mask row for bit 2 will have a lower priority than both sets of mask rows for bit 3.

The associative memory will similarly include two sets of bit masks for all bits of S and O (bit 1 and bit 0), where each next set will have a lower priority than earlier sets. Finally, a catchall mask row 528 will have all "don't cares" for S and O, and will have an associated result of "false," because an addition of 1 to S cannot result in S remaining unchanged. Consequently, for an input key that includes C that is equal to 1, the portion of the associative memory would be able to, in one cycle, indicate whether or not 1+S is equal to O.

Figure 6:
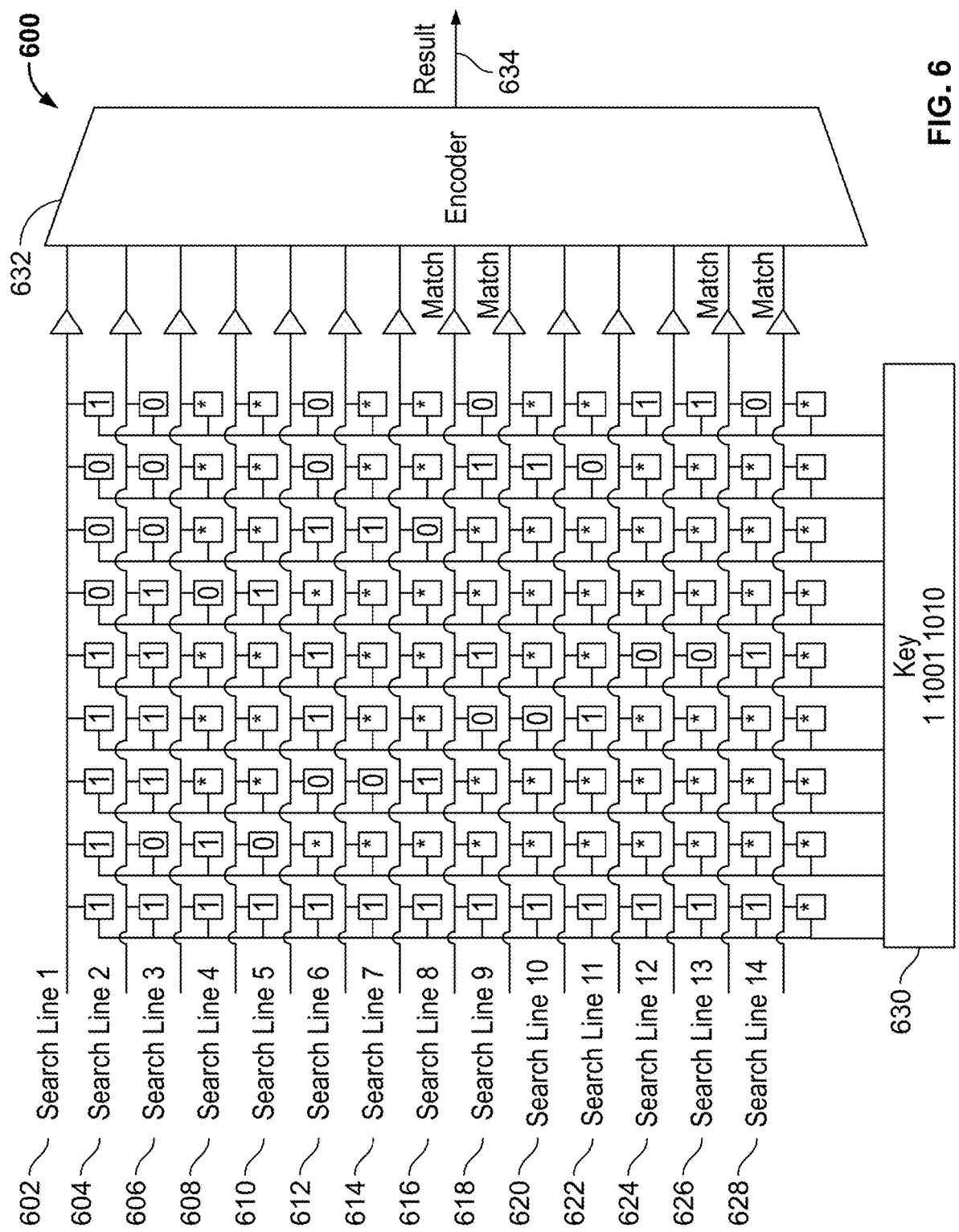
FIG. 6 shows an exemplary configuration of an associative memory, in accordance with some embodiments of the disclosure.

FIG. 6 shows an exemplary configuration of associative memory 600 that is configured in accordance with the table shown in FIG. 5. That is, associative memory 600 when configured as depicted in FIG. 5 would be able to check whether an input key that includes three values C, S, and O meets the condition of C+S=O for cases where C is equal to 1. In some embodiments, the check is performed in a single clock cycle. The key may be received from processing circuitry of a packet forwarding device that is performing a checksum boundary check on a packet received from another device.

As shown, input key 630 is "1 1001 1010" (where C is "1," S is "1001," and O is "1010"). However, any other 9-bit key may be inputted into associative memory 600. Associative memory 600 includes 14 mask rows as defined by the table shown in FIG. 5. Each mask row is connected to a respective search line of search lines 602-628. In some embodiments, on the rising edge of a system clock, power may be provided along each search line 602-628, while the values of key 630 are fed into each search line using circuits depicted as vertical lines in FIG. 6.

Each search line 602-628 will output a match signal to encoder 632 only when each cell along the match line matches the value of the key being fed into that cell via the circuits depicted as vertical lines. In some embodiments, because the comparisons are performed simultaneously, the encoder may receive match signals on all search lines before the next rising edge of the system clock.

As shown, key "1 1001 1010" will generate match signals only for search lines 8, 9, 13 and 14. Search lines 1 and 2 failed to produce a "match signal" because adding 1 to 1001 does not perturb all 4 bits of 1001. Search lines 3 and 4 failed to produce a "match signal" because bit 3 of 1001 is equal to bit 3 of 1010. Same is true for the 3 bit perturbation check (encoded by search line 5), and for bit 2 inequality check encoded by search lines 6 and 7.

Search line 8 includes mask bits "10110" and is configured to check whether adding 1 to S would perturb 2 bits of S. Key "1 1001 1010" matches mask bits "10110" because adding 1 to 1001 perturbs both bit 1 and bit 0. For this reasons line 8 produces a "match" signal.

Additionally, line 9 produces a match signal because the $1^{st}$ bit of 1001 and $1^{st}$ bit of 1010 are different. Similarly, line 13 produces a match signal because the bit 0 of 1001 and bit 0 of 1010 are also different. Finally, line 14 always produces a match signal (when C=1) because it only has "don't care" masks in all places that encode possible values of S and O. However, because search line 8 has a higher priority than search lines 9, 13, and 14, these match signals will not affect the ultimate output 634 of encoder 632, as will be explained with reference to FIG. 7.

Figure 7:
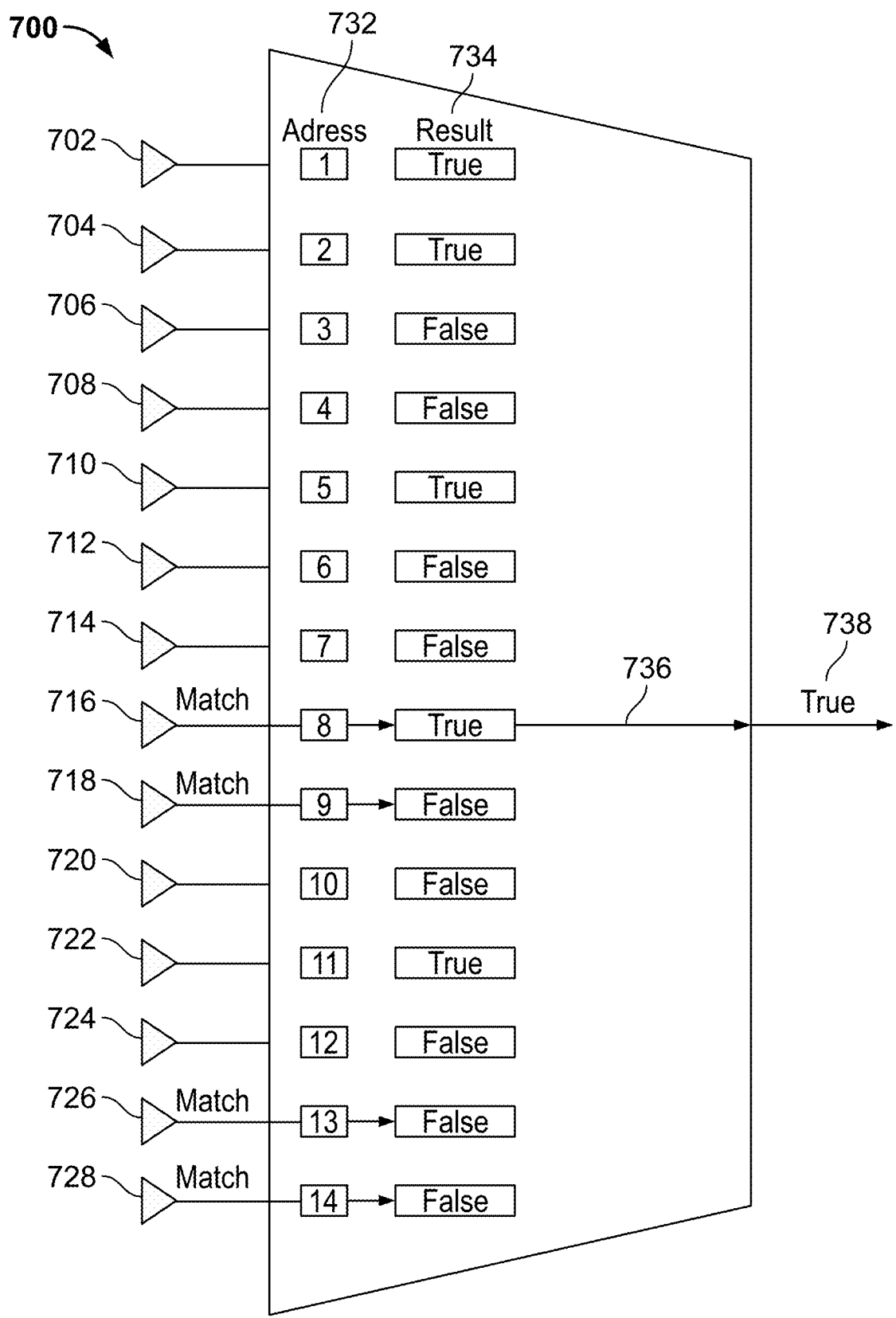
FIG. 7 shows an exemplary configuration of an encoder of an associative memory of FIG. 6, in accordance with some embodiments of the disclosure.

FIG. 7 shows an exemplary configuration of an encoder of associative memory 600 of FIG. 6, in accordance with some embodiments of the disclosure. For example, encoder 700 may be encoder 632 of FIG. 6. The encoder may include inputs 702-728 for each of the search lines 602-628. Each input 702-728 may represent an address of associative memory 600 (e.g., as shown by column 732). Each address in column 732 is associated with a result in column 734. Result column 734 is configured in accordance with the result column of the table shown in FIG. 6. For example, addresses 1 and 2 may have an associated result of "true" because search lines 1 and 2 encode a perturbation check as described above with reference to FIG. 5. Similarly, addresses 3 and 4 may have an associated result "false" because search lines 3 and 4 encode an inequality check as described above with reference to FIG. 5.

Each address has an associated priority. As shown, lower addresses always have a higher priority than higher addresses (e.g., address 1 has a higher priority than any of addresses 2-14). In some embodiments, the associative memory can have mask rows physically arranged in any other order, with priority being suitably defined to achieve the same functionality as shown in FIG. 7. For example, higher addresses may always have a lower priority than higher addresses.

In the shown example, only search lines 716, 718, 726, and 728 have generated a "match signal." The encoder then selects a value of "true" 736, because address 8 is the address with the highest priority that generated a match signal. The value "true" is then provided as output 738. Encoder 700, will, in general, return the result value associated with an address that produced a match and has the highest priority among all addresses that generated a match signal. The result value may be provided to processing circuitry of a packet forwarding device that is performing a checksum boundary check.

In another embodiment (not shown), encoder 700 may simply return address numbers that are associated with search lines that generated a match signal. For example, in the shown example, encoder 700 may return address numbers 8, 9, 13, and 14. In this embodiment, a table with rows 732 and 734 may be stored in conventional memory, and processing circuitry of a packet forwarding device may search for the result associated with address "8" (since it has the highest priority) in that table.

While associative memory 600 was shown to check only whether an addition of 1 (C) to a 4-bit number (S) has resulted in another 4-bit number (0), one skilled in the art would easily understand that associative memory 600 can be readily adopted to perform an addition check for any value of C, and for any length of S and O (e.g., as shown in FIGS. 2-4). Furthermore, one skilled in the art would understand that associative memory may also be configured ion accordance with table shown in FIGS. 2-4 similarly as to how associative memory 600 implemented the table of FIG. 5.

Figure 8:
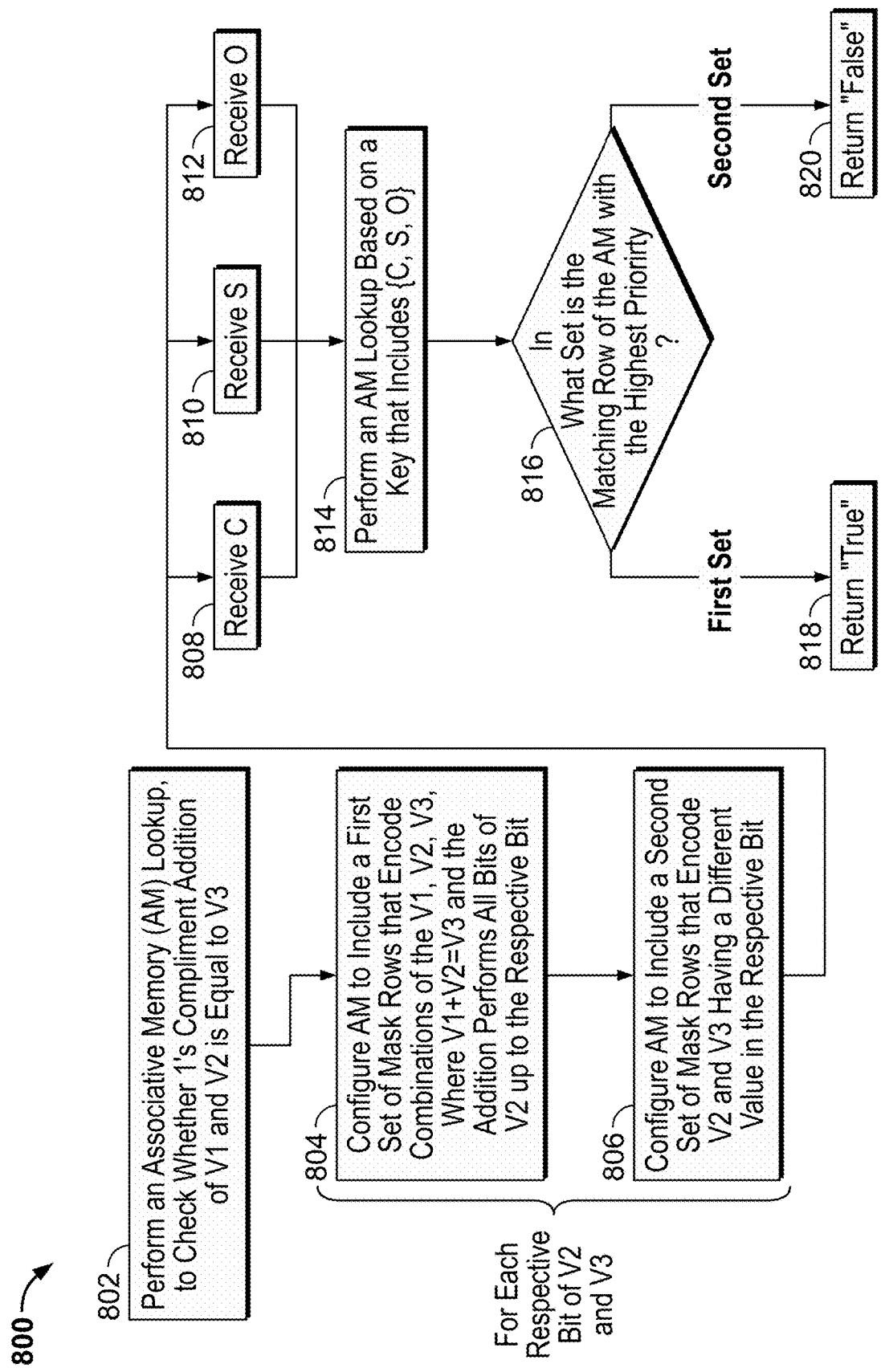
FIG. 8 is a flowchart of a detailed illustrative process for using an associative memory to compare numbers, in accordance with some embodiments of the disclosure.

FIG. 8 is a flowchart of an illustrative process for using associative memory to compare numbers, in accordance with some embodiments of the disclosure. For example, process 800 may be performed by a control circuitry of a device (e.g., a packet forwarding device). In some embodiments, control circuitry may comprise the associative memory (e.g., a TCAM). For example, the control circuitry may be control circuitry 1018 of packet forwarding device 1017 of FIG. 10 described below.

A process 800 for comparing numbers may begin at block 802, where control circuitry begins performing an associative memory (e.g., TCAM) lookup to check whether one's complement addition of value V1 to value V2 will equal value V3.

To perform the associative memory lookup, the control circuitry accesses associative memory that is configured as shown in blocks 804 and 806 (e.g., to achieve configuration shown in FIGS. 2-4). Steps shown in blocks 804 and 806 may be repeated for each respective bit of V2 and V3. At 804, the associative memory may be configured by the control circuitry to include a first set of mask rows that encode combinations of the V1, V2, V3, where V1+V2=V3 and the addition perturbs all bits of V2 up to the respective bit. At 806, the associative memory is configured by the control circuitry to include a second set of mask rows that encode V2 and V3 having a different value in the respective bit. The first set of mask rows may have an associated result value of "true," while the second set of mask rows may have an associated result value of "false." Mask rows associated with higher bits will have a higher priority than mask rows associated with lower bits. The first set of mask rows will also have a higher priority than the second set of mask rows. Steps 804-1006 may also be repeated for all desired values of V1. As explained above, with reference to FIGS. 2-4 and to FIG. 13, such a combination of mask row sets will create an associative memory that will be able to quickly perform a check of whether an addition of V1 to V2 will equal V3.

Figure 9:
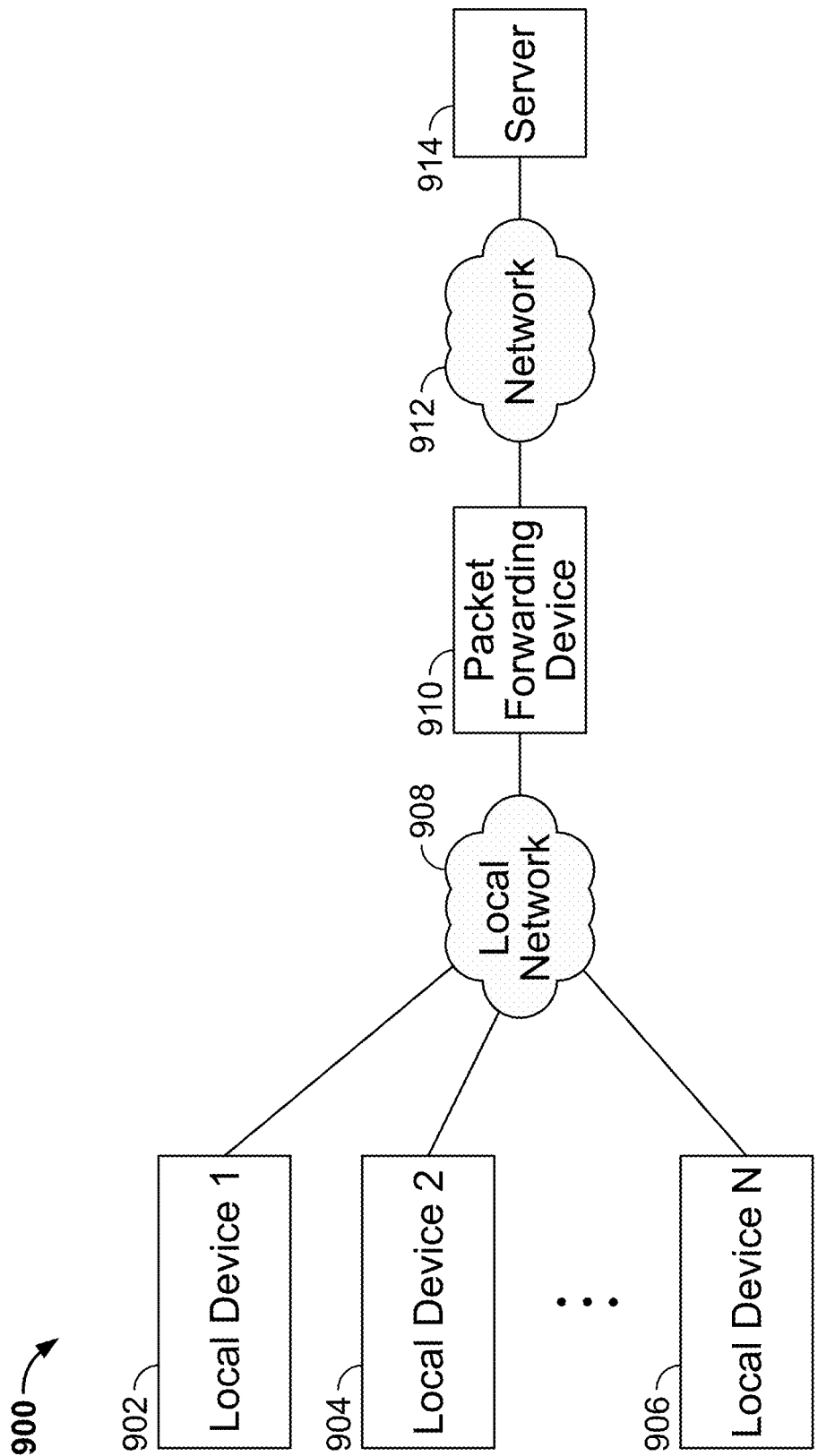
FIG. 9 shows an illustrative network topology of a system for forwarding a packet using a packet forwarding device.
Figure 10:
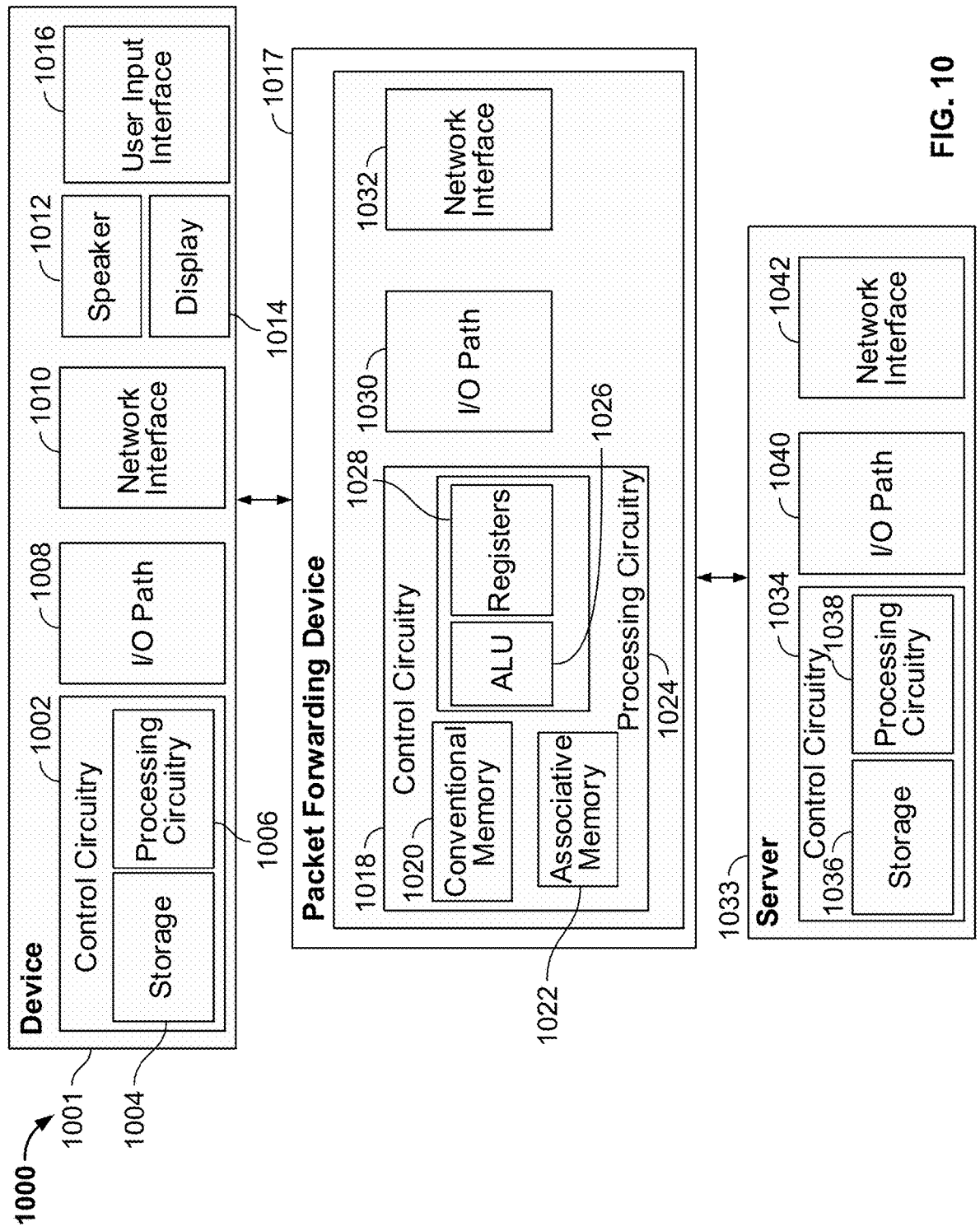
FIG. 10 shows a diagram of illustrative devices of the system of FIG. 1, in accordance with some embodiments of the disclosure.

At 808, 810, and 812, the control circuitry receives values C, S, and O (e.g., inverted accumulation value, overflow value, and original checksum, as described with relation to FIG. 10). At 814, the control circuitry inputs the connotated values C, S, and O as a key to the associative memory that was configured at steps 804-806. At 816, an encoder of the associative memory checks if the highest priority mask row of the associative memory that generated a match signal (e.g., as shown in FIG. 6) is in one of the first sets of mask rows configured in step 804 or in one of the second sets of mask rows configured in step 806. If the highest priority matching mask row of the associative memory is in the first sets of mask rows, the control circuitry returns a value of "true" (at block 818) to indicate that C+S=0. If the highest priority matching mask row of the associative memory is in the second set of mask rows, the control circuitry returns a value of "false" (at block 820) to indicate that C+S=/=0. This output may be used as a zero value checksum boundary condition check, e.g., as described in relation to FIG. 9.

FIG. 9 depicts an illustrative system 900 that includes packet forwarding device 910. Packet forwarding device 910 may use an associative memory (e.g., a TCAM configured as described above) to more efficiently forward packets from local devices 902, 904, 906 of system 900. In some embodiments, packet forwarding device 910 may use the associative memory to perform packet sequencing checks, as will be explained below. In some implementations, packet forwarding device 910 may include two associative memories dedicated to boundary condition and to packet sequencing, respectively.

System 900 includes local network 908 that may include several local devices 902, 904, 906. Each one of the local devices 902, 904, 906 may be a personal computer, a tablet, a mobile phone, a server, any other computing device, or any combination thereof. While three local devices are depicted, local network 908 may include other numbers of devices. Local network 908 may be a LAN, a WLAN, a virtual LAN, a mobile network, any other computer network, or any combination thereof. In one implementation, local devices 902, 904, 906 may be able to communicate (e.g., by sending and receiving packets) to an outside server (or to any other external device) that is not a part of local network 908. For example, local devices 902, 904, 906 may communicate with server 914 via network 912. Network 912 may be the Internet, a WAN, an extranet, a mobile network, any other suitable computer network, or any combination thereof. For example, local device 902 may send a UDP packet to server 914 to be delivered via network 912. In some embodiments, server 914 may also include associative memory for performing packet sequencing checks.

In the shown implementation, local devices 902, 904, 906 may communicate with outside network 912 through packet forwarding device 910. For example, packet forwarding device 910 may be one of network bridge, a network hub, a network switch, a network router, or any combination of the above. Packet forwarding device 910 may receive a packet from any one of local devices 902, 904, and 906 (e.g., an IP packet, a UDP packet, or any other packet) and forward that packet to server 914 via network 912. Often, packet forwarding device 910 will perform a Network Address Translation (NAT) operation on a received packet before it is forwarded. For example, a packet received from local device 902 may include a destination address that is only valid within local network 908. In this case, packet forwarding device 910 will translate an internal destination address to an address that is appropriate for network 912 (e.g., an address from a public space).

In some embodiments, packet forwarding device 910 receives a UDP packet from local device 902. A UDP packet, may include a payload and a header. The header may include the following fields: {Source port, Destination Port, Length, and Checksum}. In one embodiment, when UDP runs over IP (e.g., over IPv4), the packet may include the following fields: {Source IP address, Destination IP address, Protocol, UDP length, Source port, Destination Port, Length, and Checksum}. The checksum may include a value that is computed as 16-bit one's complement of the one's complement sum of a header of information from the IP header, the UDP header, and the data of the packet. In some embodiments, 4 bit, 8 bit, 32 bit or 64 bit addition may be used instead.

Upon receipt of the packet, the packet forwarding device 910 may perform a NAT operation for the received packet that includes the original checksum (O). For example, the Destination IP address may be translated from a local IP address valid within local network 908 to the Internet address valid on network 912. For example, initial Destination IP address 192.168.1.1 may be translated to Public IP address 145.12.131.74. The translation of the address necessitates an update to the checksum. Other changes to the packet or to the header may also necessitate updates to the checksum before the packet is forwarded to server 914 (which may have address 145.12.131.74).

In some embodiments, packet forwarding device 910 may have access to two's complement addition hardware and to associative memory (e.g., TCAM) that is configured in the way that is described in FIGS. 2-4. For example, packet forwarding device 910 determines that there are N different checksum impacting updates ($U_1 \ldots U_n$) to the packet's headers (e.g., generated by NAT and by other changes to the received packet). Packet forwarding device 910 identifies a delta for each of the updates $U_1 \ldots U_n$ ($D_1 \ldots$). For example, if NAT updates the address 192.168.1.1 (11000000.10101000.00000001.00000001) to 145.12.131.74 (10010001.00001100.10000011.01001010), packet forwarding device 910 will generate 2 16-bit update values of D: D1—(11000000 10101000-10010001 00001100), and D2—(00000001 00000001-10000011 01001010).

Packet forwarding device 910 may use the values ($D_1 \ldots D_n$) and the original checksum O to compute an updated checksum (e.g., as described in RFC 1624). However, sometimes, the new checksum will have all 0's in all bit positions (e.g., the new checksum will be 0x0000). This is undesirable because such a checksum indicates that no checksum was computed at all. For this reason, conventional packet forwarding devices need to perform an additional check for this boundary condition and change the new checksum to have all one's in all bit positions (e.g., the new checksum would be set to 0xffff). Such an additional check may introduce a bubble in the pipeline and slow down packet forwarding operations.

Packet forwarding device 910 uses an on-board associative memory (e.g., configured as described in relation to FIGS. 1-3) to perform the boundary check in parallel with computation of the new checksum. Once all values of $D_1 \ldots D_n$ are calculated, packet forwarding device 910 may use on board two's complement arithmetic hardware to compute two's complement sum of all values $D_1 \ldots D_n$, while accumulating overflow bits. For example, packet forwarding device 910 may compute an inverse of two's complement accumulation value, using the following formula: $S=(\Sigma_{i=1}^{N} D_i)$ & 0xffff, where all values $D_1 \ldots D_n$ are summed and then inverted via AND operation with a value that has 16 bits of 1s. Packet forwarding device 910 may also compute an inverse of two's complement overflow value, using the following formula: $C=(\Sigma_{i=1}^{N} D_i)>>16$, where all values $D_1 \ldots D_n$ are summed, and the result is shifted right by 16 bits.

Computed values S, C and the packet's original checksum O are then used by packet forwarding device 910 as keys in an associative memory (e.g., TCAM) lookup. The associative memory is configured to return a value of "true" if S+C=O, and to return a value of "false" if S+C is not equal to O. The configuration of the associative memory to achieve this functionality is described with respect to discussion of FIGS. 2-4. In some embodiments, the associative memory performs the check in one clock cycle. If the associative memory returns a value of true, the checksum of the packet is set to all 1 (e.g., to 0xffff). Otherwise the checksum is set to the result of a regular checksum update computation (that may be performed in parallel with the associative memory lookup). In this way, the boundary condition of the checksum being equal to 0x0000 is handled in one clock cycle without slowing down the operation of packet forwarding device 910.

In some embodiments, packet forwarding device 910 or server 914 may use on-board associative memory (e.g., configured as described in relation to FIGS. 1-3) to perform packet sequencing verification. For example, packet forwarding device 910 may use the same associative memory that is used for boundary conditions check described above, or another associative memory. For example, packet forwarding device 910 or server 914 may receive a sequence of packets (e.g., TCP or SMTP packets) from any one or more of devices 902-906. For example, server 914 may receive packet 1 (having sequence number C) and packet 2 (having sequence number O) from device 902. To check if packet 2 is a packet that directly follows packet 1, server 914 may use on-board associative memory (e.g., configured as described in relation to FIGS. 1-3) to check if C+1=O. The result of the check may be used by server 914 to properly concatenate data from packet 1 and packet 2. This packet-ordering technique may be used by any network device that receives a stream of packets (of any suitable type) from any other network device. In one implementation, the sequence number may be a time stamp. In some embodiments, a network device may use on-board associative memory configured as described below to check if a time stamp plus another time period is greater than another timestamp.

FIG. 10 shows a diagram of illustrative devices of a system 1000 that includes device 1001, packet forwarding device 1017, and server 1033. For example, device 1001 may be the as local device 902, packet forwarding device 1017 may be the same as packet forwarding device 910, and server 1033 may be the same as server 914.

Device 1001 may receive and send data via an input/output (I/O) path 1008. I/O path 1008 is communicatively connected to control circuitry 1002, which includes processing circuitry 1006 and storage (or memory) 1004. Control circuitry 1002 may send and receive commands, requests, and other suitable data using I/O path 1008. I/O path 1008 may connect control circuitry 1002 (and specifically processing circuitry 1006) to one or more network interfaces 1010, which in turn connect device 1001 to other devices on the network (e.g., network 908 or 912).

Control circuitry 1002 may be based on any suitable processing circuitry, such as processing circuitry 1006. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 1002 executes instructions stored in memory (i.e., storage 1004). For example, the instructions may cause control circuitry 1002 to send a UDP packet to server 1033 via network interface 1010.

User device 1001 may include user input interface 1016, which may include keyboard, mouse, touchscreen, any other human interface device, or any combination thereof. User device 1001 may also include speaker 1012 and display 1014 used for providing output to the user of device 1001. In some embodiments, user input received via user interface 1016 causes control circuitry 1002 to send UDP packets to server 1033 via network interface 1010 (e.g., when the user requests data from an outside server).

A packet sent from network interface 1010 may be received and processed by packet forwarding device 1017. Packet forwarding device 1017 may be a router, a switch, a hub, a bridge, any other computing device, or any combination thereof. Packet forwarding device 1017 may receive and send data via an input/output (I/O) path 1030. For example, a packet received (e.g., from device 1001) via network interface 1032 may be provided to control circuitry 1018 via I/O path 1030. I/O path 1030 is communicatively connected to control circuitry 1018, which includes processing circuitry 1024 and storage (or memory) 1020 and or associative memory 1022. Control circuitry 1002 may send and receive commands, requests, and other suitable data using I/O path 1030. I/O path 1030 may connect control circuitry 1018 (and specifically processing circuitry 1024) to one or more network interfaces 1032, which in turn connect device 1017 to other devices on the network (e.g., network 908 or 912). As shown, processing circuitry 1024 may include an on-board Arithmetic/Logic Unit (ALU) 1026 and local registers 1028, which may be used to perform two's complement arithmetic. Control circuitry 1018 that includes processing circuitry 1024 may also include associative memory (e.g., TCAM) 1022 in addition to conventional memory 1020. Associative memory 1022 may be used by control circuitry 1018 to perform high speed operations (e.g., NAT). As explained herein, associative memory may also be used to speed up checksum updates. In some embodiments, packet forwarding device 1017 may include more than one associative memory. For example, packet forwarding device 1017 may include another associative memory for performing a packet sequencing check (e.g., as described in FIG. 12).

Control circuitry 1018 may be based on any suitable processing circuitry, such as processing circuitry 1024. Processing circuitry 1024 may include the types of hardware described above in relation to processing circuitry 1006. In some embodiments, control circuitry 1018 executes instructions stored in memory (e.g., a storage 1020). For example, the instructions may cause control circuitry 1018 to receive a UDP packet from device 1001, perform NAT, update the checksum of the packet, and forward it to server 1033 via network interface 1032.

Memory 1020 may be an electronic storage device that is part of control circuitry 1018. As referred to herein, the phrase "electronic storage device" or "storage device" should be understood to mean any device for storing electronic data, computer software, instructions, and/or firmware, such as random-access memory, hard drives, optical drives, solid state devices, quantum storage devices, or any other suitable fixed or removable storage devices, and/or any combination of the same. Nonvolatile memory may also be used. The circuitry described herein may execute instructions included in software running on one or more general purpose or specialized processors. Associative memory 1022 may be an electronic storage device provided as associative memory 1022 that is part of control circuitry 1018. For example, suitable associative memory 1022 may be a TCAM. Multiple circuits may be provided to handle simultaneous processing functions. For example, control circuitry 1018 may be able to use ALU 1026 to compute a checksum update in a regular manner, while simultaneously performing a zero boundary check using associative memory lookup via associative memory 1022. In some embodiments, associative memory 1022 may be configured as described above with respect to FIGS. 2-4.

A packet sent from user device 1001 and forwarded by packet forwarding device 1017 may be received by server 1033. As depicted, server 1033 may be a web server, an application server, a general-purpose server, any other computing device, or any combination thereof. Server 1033 may receive and send data via an input/output (I/O) path 1040. I/O path 1040 is communicatively connected to control circuitry 1034, which includes processing circuitry 1038 and storage (or memory) 1036. Control circuitry 1034 may send and receive commands, requests, and other suitable data using I/O path 1040. I/O path 1040 may connect control circuitry 1034 (and specifically processing circuitry 1038) to one or more network interfaces 1042, which in turn connect server 1033 to other devices on the network (e.g., network 908 or 912).

Control circuitry 1034 may be based on any suitable processing circuitry, such as processing circuitry 1038. Processing circuitry 1038 may include the types of hardware described above in relation to processing circuitry 1006. In some embodiments, control circuitry 1034 executes instructions stored in memory (e.g., a storage 1036). For example, the instructions may cause control circuitry 1034 to receive a UDP packet from packet forwarding device 1017 via network interface 1042. In some embodiments, server 1033 may include an associative memory. For example, server 1033 may include an associative memory for performing a packet sequencing check (e.g., as described in FIG. 12).

Figure 11:
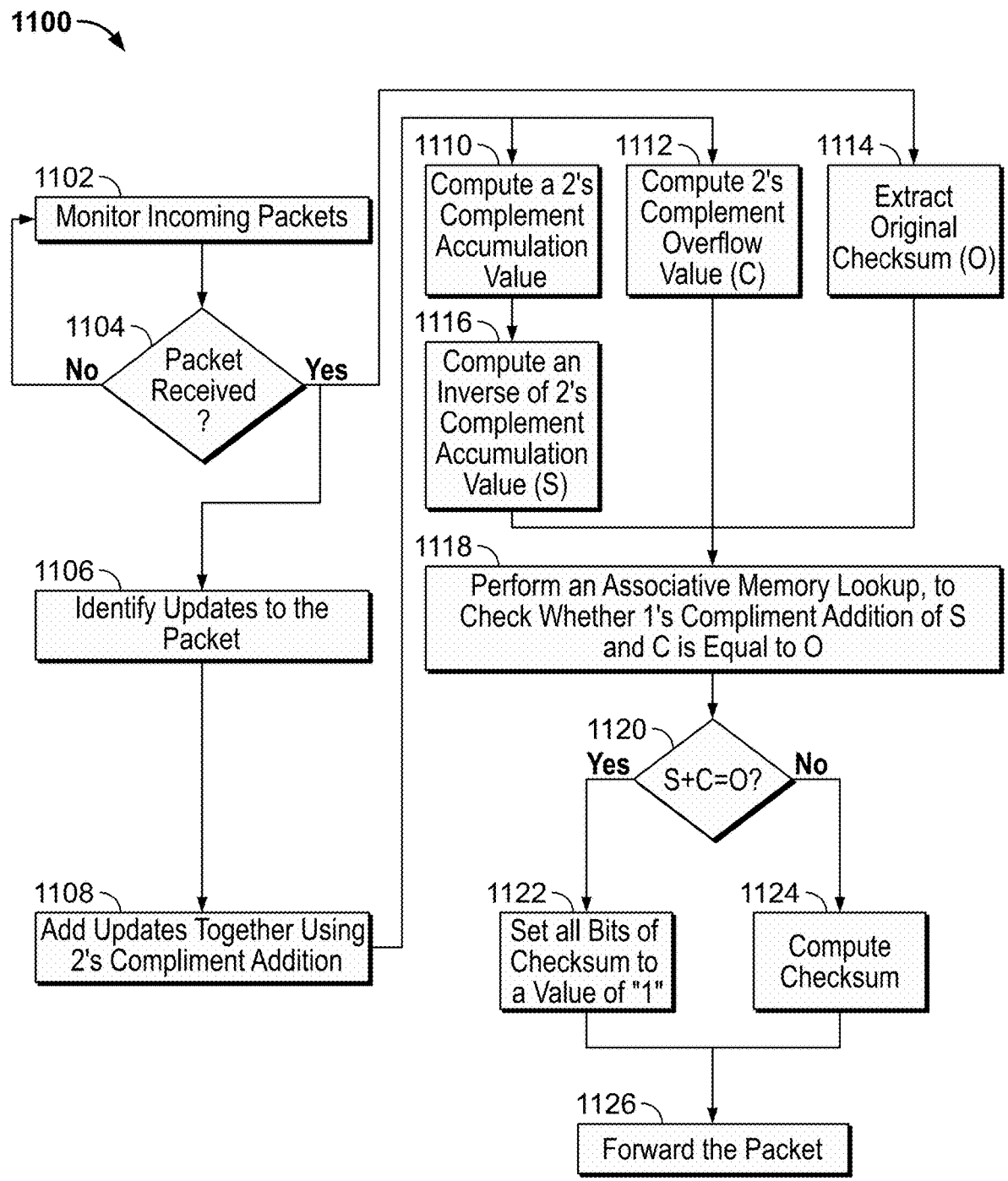
FIG. 11 is a flowchart of a detailed illustrative process for performing a checksum update, in accordance with some embodiments of the disclosure.

FIG. 11 is a flowchart of an illustrative process for performing a checksum update, in accordance with some embodiments of the disclosure. Process 1100 begins at block 1102. Control circuitry, such as control circuitry 1018 of packet forwarding device 1017, begins monitoring a network for incoming packets. For example, control circuitry 1018 may check whether a packet was received via network interface 1032 (e.g., from device 1001). At 1104, if a packet is received, control circuitry 1018 extracts the original checksum (O) from the received packet (block 1114) and proceeds to block 1106. If no packet is received, control circuitry 1018 continues monitoring incoming packets at block 1102.

At 1106, control circuitry 1018 identifies all updates to the packet that will impact update to the checksum. For example, control circuitry 1018 may, at step 1106, perform NAT which would change a header in the received packet by substituting a local network destination address with an address from the public address space. In 16-bit environment, NAT may result in up to four 16-bit updates that will affect the checksum. For example, if the destination IP address 192.168.1.1 was translated to public IP address 145.12.131.74, two updates deltas will be identified by: (1) subtracting the first 16 bits of the new address from the first 16 bits of the old address; and (2) subtracting the last 16 bits of the new address from the last 16 bits of the old address.

At 1108, control circuitry 1018 performs a two's complement addition of the identified updates. The addition may generate a two's complement accumulation value (e.g., as described above with reference to FIG. 9) at block 1110. The two's complement accumulation value may then be inverted (S) at block 1116. For example, an adder circuit of an ALU may be used that accepts deltas and produces a sum value to compute the two's complement accumulation value. In some embodiments, inverted two's complement accumulation value S may instead be directly calculated based on the identified updates. At 1112, control circuitry 1018 may also compute the 2' complement overflow value (C), (e.g., as described above with reference to FIG. 9). For example, an adder circuit may be used to perform an addition of the deltas, and a shifter circuit may be used to shift the result of the addition right by 16 bits. In some embodiments, control circuitry 1018 may use hardware ALU 1026 and registers 1028 to perform functions of blocks 1108-1114, (e.g., when the ALU is configured to perform two's complement arithmetic).

At 1118, control circuitry 1018 performs an associative memory lookup by inputting C, S, and O as a key to associative memory 1022. In this embodiment, associative memory 1022 is configured as explained in FIGS. 2-4 or in FIG. 13 to perform a check whether C+S=O (in one's complement).

At 1120, control circuitry 1018 checks whether C+S=O (in one's complement arithmetic) based on whether associative memory 1022 returned a value of true or a value of false. At 1122, if C+S=O, control circuitry 1018 sets all bits of the new checksum to a value of 1, to avoid the new checksum having all values of 0. At 1124, if C+S=/=O, control circuitry 1018 may compute a new checksum using regular techniques (e.g., technique described in RFC 1624) and set the checksum of the received packet to the calculated value.

In one embodiment, computation of step 1124 is performed simultaneously with step 1118. In this embodiment, control circuitry 1018 will simply discard the calculated value in step 1124, if C+S=O.

At block 1126, control circuitry 1018 forwards the packet (e.g., to server 1033) using network interface 1032. The forwarded packet will include either a new checksum set at block 1122 or a new checksum calculated at block 1124.

Figure 12:
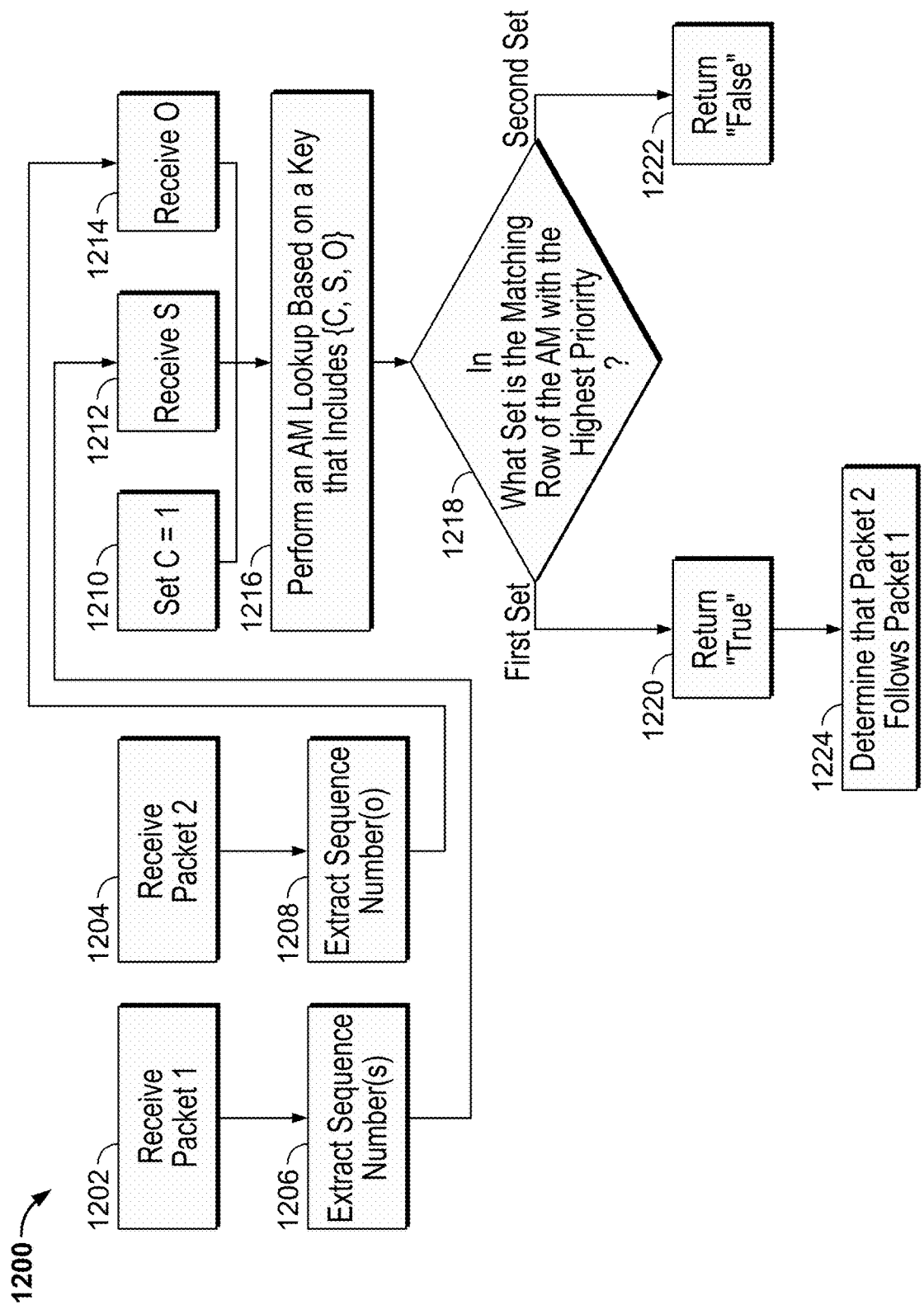
FIG. 12 is a flowchart of a detailed illustrative process for performing a sequence check, in accordance with some embodiments of the disclosure.

FIG. 12 is a flowchart of an illustrative process 1200 for performing a packer sequencing check, in accordance with some embodiments of the disclosure. Process 1200 begins at block 1202. Control circuitry, such as control circuitry 1018 of packet forwarding device 1017, receives packet 1. At 1204 control circuitry 1018 receives packet 2. Steps 1202 and 1204 may be performed in any order, thus making it necessary to check whether packet 2 directly follows packet 1 in a sequence of packets. In some embodiments, packets may be received from one of devices 902-906 as part of a packet stream.

At 1206, control circuitry 1018 extracts the sequence number (C) from packet 1. At 1208, control circuitry 1018 extracts the sequence number (O) from packet 2. For example, control circuitry 1018 may extract a timestamp of sequence field from a header of each respective packet. At 1210, control circuitry 1018 sets value of C to "1." At 1212 control circuitry 1018 sets value "S" to the sequence number of packet 1. At 1214, control circuitry 1018 sets value "S" to the sequence number of packet 2.

At 1216, control circuitry 1018 performs an associative memory lookup by inputting C, S, and O as a key to an associative memory (e.g., associative memory 1022 or another associative memory). In this embodiment, the associative memory is configured as explained in FIGS. 2-4 or in FIG. 13 to perform a check whether C+S=O. In some embodiments, the associative memory is configured to perform a check whether C+S=O in two's complement arithmetic. In this case, the associative memory may be configured as described below with respect to FIG. 14.

At 1218, control circuitry 1018 performs an associative memory lookup by inputting C, S, and O as a key to the associative memory. In this embodiment, the associative memory is configured as explained in FIGS. 2-4 or in FIG. 13 to perform a check whether C+S=O. At 1218, an encoder of the associative memory checks if the highest priority mask row of the associative memory that generated a match signal (e.g., as shown in FIG. 6) is in one of the first sets of mask rows or in one of the second sets of mask rows. If the highest priority matching mask row of the associative memory is in the first sets of mask rows, the control circuitry returns a value of "true" (at block 1220) to indicate that C+S=O. If the highest priority matching mask row of the associative memory is in the second set of mask rows, the control circuitry returns a value of "false" (at block 1222) to indicate that C+S=/=O. This output may be used for sequence checking purposes. In particular, at 1224, control circuitry 1018 may confirm that packet 2 directly follows packet 1. In this case, control circuitry 1018 may concatenate payloads of packet 1 and packet 2 in proper order.

FIG. 13 shows another exemplary table for configuring associative memory, in accordance with some embodiments of the disclosure. As can be seen above, mask rows 306-308 (that check for bit 15 inequality) have the same values for S and O as mask rows 414-416 (that also check for bit 15 inequality). Accordingly, in some embodiments, the associative memory may be configured such that mask rows that encode inequality checks are shared for different values of C. One such configuration of the associative memory is illustrated in FIG. 13. As shown, columns C, S and O correspond to mask configurations of the associative memory, while column "Result" is associated with a value that is returned by an encoder of the associative memory when the associated mask row produces a match signal. In particular, FIG. 13 show a full configuration of an associative memory (e.g., TCAM) of a device (e.g., a packet forwarding device) that can accept values C, S, and O as a key and return the result of "true" when C+S is equal to O (using one's complement arithmetic) while encoding values of C equal to 0, 1, 2, 3, 4, or 5.

As explained above, associative memory configured according to the table will include multiple mask rows 13001-13415 that encode different possible values of C, S, and O. As described above the mask rows may be arranged in pairs of sets (for each bit of S and O). The first set of the pair is configured to performs a perturbation check (e.g., checking if all bits up to a particular bit are perturbed by addition of C+S), while the second set of the pair performs bit inequality check (checking whether the particular bit of C is different for the particular bit). For example, mask rows 13019-13057 check whether C+S perturbs all bits of S for all values of C in the range 1-5. This perturbation check is followed by inequality check of bit 15 of S and O by mask rows 13059-13061.

This pattern is repeated for bit 14. For example, mask rows 13063-13083 check whether C+S perturbs first 14 bits of S for all values of C in the range 1-5. This perturbation check is follows by inequality check of bit 14 of S and O by mask rows 13085-13087. This pattern is repeated for the rest of mask rows 13001-13415

Beneficially, in this implementation, the mask rows that perform inequality checks are shared between perturbation checks for all values of C in range of 0-5. Same sharing is also achieved for other inequality checks. As a result, less mask rows may be needed to encode the check for whether C+S is equal to O (using one's complement arithmetic).

In some embodiments, the associative memory may also be configured to perform two's complement arithmetic check rather than one's complement arithmetic check. To that end, FIG. 14 shows another exemplary table for configuring associative memory, in accordance with some embodiments of the disclosure. As shown, columns C, S and O correspond to mask configurations of the associative memory, while column "Result" is associated with a value that is returned by an encoder of the associative memory when the associated mask row produces a match signal. In particular, FIG. 14 show a configuration of an associative memory (e.g., TCAM) of a device (e.g., a packet forwarding device) that can accept values C, S, and O as a key and return the result of "true" when C+S is equal to O (using two's complement arithmetic) while encoding values of C are equal to 1. FIG. 14 illustrates encodings of the associative memory that capture the value of C being equal to 1. However, one skilled in the art would appreciate that associative memory may be similarly encoded to handle any value of C.

In this, case, the associative memory is configured to have two sets of mask rows for each respective bit of S and O. In particular, for bit 3 of S and O, the associative memory includes a first set of mask rows (mask rows 1401 and 1403) that exhaustively encode all combinations of S and O where S+1 is equal to 0 (in two's complement) and where all 4 bits of S would be perturbed by an addition of 1. For example, mask row 1401 encodes a situation where S is equal to "1111" and O is equal "0000" because adding "1" to "11111" would perturb (e.g., flip)" all 4 bits of S. Similarly, mask row 1403 encodes a situation where S is equal to "0111" and O is equal to "1000" because adding "1" to "01111" would perturb (e.g., flip) all 4 bits of S. This first set of mask rows is associated with a result value of "true" because it encodes situation where S+1 is equal to O (in two's complement).

Further, for bit 3 of S and O, the associative memory includes a second set of mask rows (mask rows 1405 and 1407) that encodes situations where bit 3 of S and bit 3 of O are unequal. This second set of mask rows is associated with a result value of "false." The pattern is repeated for bits 2, 1, and 0 of S and O. As explained above, such configuration of associative memory results in an output of "true" when C+S=0 (in two's complement) and output of "false" when C+S=/=O (in two's complement). While associative memory in FIG. 14 is shown for 4 bit arithmetic, one skilled in art would understand that any length of values S and O may be handled in a similar manner.

FIG. 15 shows another exemplary table for configuring associative memory, in accordance with some embodiments of the disclosure. As shown, columns C, S and O correspond to mask configurations of the associative memory, while column "Result" is associated with a value that is returned by an encoder of the associative memory when the associated mask row produces a match signal. In particular, FIG. 15 shows a configuration of an associative memory (e.g., TCAM) of a device (e.g., a network device) that can accept values C, S, and O as a key and return the result of "true" when C+S is greater than O (using arithmetic that assumes that carry bit should be included in the comparison, i.e., where number that wrap are large than number that do not wrap) while encoding a value of C being equal to 1. While encoding for value of C being equal to 1 is shown, one skilled in the art would appreciate that an associative memory may be similarly encoded to handle any value of C.

In this, case, the associative memory is configured to have two sets of mask rows for each respective bit of S and O. In particular, for bit 3 of S and O, the associative memory includes a first set of mask rows (mask rows 1501 and 1503) that exhaustively encode all combinations of S and O where S+1 is greater than 0 (using arithmetic that assumes that carry bit should be included in the comparison) and where all 4 bits of S would be perturbed by an addition of 1. For example, mask row 1501 encodes a situation where S is equal to "1111" and O is any 4 bit number (masked as "**") because adding "1" to "11111" would perturb (e.g., flip)" all 4 bits of S. Furthermore, addition of "1" to "1111" is guaranteed to be larger than any 4 bit number, and therefore O is encoded as any 4 bit number. Similarly, mask row 1503 encodes a situation where S is equal to "0111" and O is masked as any number that begins with 0 (masked as "0*") because adding "1" to "0111" would perturb (e.g., flip)" all 4 bits of S. Furthermore, addition of "1" to "0111" is guaranteed to be larger than any 4 bit number that begins with a "0", and therefore O is encoded as "0***". This first set of mask rows is associated with a result value of "true" because it encodes situation where S+1 is greater than 0.

Further, for bit 3 of S and O, the associative memory includes a second set of mask rows (mask rows 1505 and 1507) that encodes situations where bit 3 of S and bit 3 of O are unequal. In the second set of masks, a mask row is associated with a result value of "false" when bit 4 of value S is "0" and bit 4 of value O is "1," because numbers that begin with "0" cannot be greater than numbers that begin with "1." Further, in the second set of mask rows, a row is associated with a result value of "true" when bit 4 of value S is "1" and bit 4 of value O is "0," because numbers that begin with "1" are be greater than numbers that begin with "0." This pattern of sets of mask rows is repeated for all other bits of S an O.

As a result, such configuration of associative memory results in an output of "true" when C+S>0 and output of "false" when C+S<=O. While associative memory in FIG. 15 is shown for 4 bit arithmetic, one skilled in art would understand that any length of values S and O may be handled in a similar manner.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for comparing values using an associative memory, the method comprising:
   receiving a packet;
   performing an associative memory lookup based on a key that comprises a first number, a second number, and a third number, wherein the first number and the second number are calculated based on data of the packet, and wherein the associative memory comprises, for each respective bit of the second number and each respective bit of the third number:
      a first set of mask rows comprising encoded combinations of the first number, the second number, and the third number, wherein a one's complement addition of the first number and the second number perturbs all bits of the second number up to the respective bit of the second number; and
      a second set of mask rows comprising encoded combinations of the second number and the third number, wherein the respective bit of the second number and the respective bit of the third number do not match; and
   outputting a result based on the associative memory lookup;
   updating a field of the packet based on the result; and
   forwarding the packet.

2. The method of claim 1, wherein outputting the result based on the associative memory lookup comprises:
   outputting a true value in response to determining that a mask row of the first set of mask rows: (1) matches the key and (2) has the highest priority of all mask rows that match the key.

3. The method of claim 1, wherein outputting the result based on the associative memory lookup comprises:
   outputting a false value in response to determining that a mask row of the second set of mask rows: (1) matches the key and (2) has the highest priority of all mask rows that match the key.

4. A method of claim 1, wherein the associative memory is further configured such that, for each respective bit of the second number and each respective bit of the third number, the first set of mask rows has a higher priority than the second set of rows.

5. A method of claim 1, wherein the associative memory is further configured such that for each respective pair of bits of the second number and each respective bit of the third number, mask rows associated with a higher bit of the pair of bits have a higher priority than mask rows associated with a lower bit of the pair of bits.

6. The method of claim 1, the method further comprising:
   wherein the packet includes an original checksum;
   identifying a plurality of updates to the packet, each update providing a contribution to calculation of a new checksum;
   performing a two's complement addition of the plurality of contributions to compute a two's complement accumulation value and a two's complement overflow value;
   inverting the two's complement accumulation value; and
   wherein the first number is the two's complement overflow value, the second number is the inverted two's complement accumulation value, and the third number is the original checksum.

7. A system for comparing values using an associative memory, the system comprising:
   input circuitry configured to receive a packet;
   control circuitry that is communicatively connected to the input circuitry and to an associative memory circuitry, wherein the control circuitry is configured to:
      calculate a first number, a second number, and a third number based on data of the packet, and
   the associative memory circuitry that comprises, for each respective bit of the second number and each respective bit of the third number:
      a first set of mask rows comprising encoded combinations of the first number, the second number, and the third number, wherein a one's complement addition of the first number and the second number perturbs all bits of the second number up to the respective bit of the second number; and
      a second set of mask rows comprising encoded combinations of the second number and the third number, wherein the respective bit of the second number and the respective bit of the third number do not match; and
   wherein the control circuitry is further configured to:
      perform an associative memory lookup, using the associative memory circuitry, based on a key that comprises the first number, the second number, and the third number; and
      output a result based on the associative memory lookup; and
      update a field of the packet based on the result; and
   output circuitry configured to forward the packet.

8. A system of claim 7, wherein the control circuitry is configured to output the result based on the associative memory lookup by:
   outputting a true value in response to determining that a mask row of the first set of mask rows: (1) matches the key and (2) has the highest priority of all mask rows that match the key.

9. A system of claim 7 wherein the control circuitry is configured to output the result based on the associative memory lookup by:
   outputting a false value in response to determining that a mask row of the second set of mask rows: (1) matches the key and (2) has the highest priority of all mask rows that match the key.

10. A system of claim 7, wherein the associative memory is further configured such that, for each respective bit of the second number and each respective bit of the third number, the first set of mask rows has a higher priority than the second set of rows.

11. A system of claim 7, wherein the associative memory is further configured such that for each respective pair of bits of the second number and each respective bit of the third number, priority of mask rows associated with a higher bit of the pair of bits have a higher priority than mask rows associated with a lower bit of the pair of bits.

12. The system of claim 7, wherein:
wherein the packet includes an original checksum; and
wherein the control circuitry is configured to:
identify a plurality of updates to the packet, each update providing a contribution to calculation of a new checksum;
perform a two's complement addition of the plurality of contributions to compute a two's complement accumulation value and a two's complement overflow value; and
invert the two's complement accumulation value; and
wherein the first number is the two's complement overflow value, the second number is the inverted two's complement accumulation value, and the third number is the original checksum.

13. A packet forwarding device comprising:
input circuitry configured to receive a packet, wherein the packet includes an original checksum;
associative memory circuitry;
control circuitry that is communicatively connected to the input circuitry and to the associative memory circuitry, wherein the control circuitry is configured to:
identify a plurality of updates to the packet, each update providing a contribution to calculation of a new checksum;
perform a two's complement addition of the plurality of contributions to compute a two's complement accumulation value and two's complement overflow value;
invert the two's complement accumulation value;
perform an associative memory lookup, using the associative memory circuitry, based on key that comprises the inverted two's complement accumulation value, the two's complement overflow value, and the received checksum; and
in response to determining, based on the associative memory lookup, that the one's complement addition of the inverted accumulation value and the two's complement overflow value is equal to the received checksum:
set all bits of a new checksum to a value of 1; and
output circuitry communicatively connected to the control circuitry, wherein the output circuitry is configured to forward the packet that comprises the new checksum.

14. The packet forwarding device of claim 13, wherein:
the associative memory circuitry is configured to accept a key that comprises a first number, a second number, and a third number, and wherein the associative memory comprises for each respective bit of the second number and each respective bit of the third number:
a first set of mask rows comprising encoded combinations of the first number, the second number, and the third number, wherein a one's complement addition of the first number and the second number perturbs all bits of the second number up to the respective bit of the second number; and
a second set of mask rows comprising encoded combinations of the second number and the third number, wherein the respective bit of the second number and the respective bit of the third number do not match.

15. The packet forwarding device of claim 14, wherein the control associative memory circuitry is configured such that, for each respective bit of the second number and each respective bit of the third number, the first set of mask rows has a higher priority than the second set of rows.

16. The packet forwarding device of claim 13, wherein the control circuitry is further configured to:
perform a network address translation for a destination address of the packet; and
wherein one of the plurality of updates to the packet is caused by the network address translation.

17. A method comprising:
receiving a packet, wherein the packet includes an original checksum;
identifying a plurality of updates to the packet, each update providing a contribution to calculation of a new checksum;
performing a two's complement addition of the plurality of contributions to compute a two's complement accumulation value and two's complement overflow value;
inverting the two's complement accumulation value;
performing an associative memory lookup, using an associative memory, based on key that comprises the inverted two's complement accumulation value, the two's complement overflow value, and the received checksum; and
in response to determining, based on the associative memory lookup, that the one's complement addition of the inverted accumulation value and the two's complement overflow value is equal to the received checksum:
setting all bits of a new checksum to a value of 1; and
forwarding the packet that comprises the new checksum.

18. The method of claim 17, wherein:
the associative memory is configured to accept a key that comprises a first number, a second number, and a third number, and wherein the associative memory comprises for each respective bit of the second number and each respective bit of the third number:
a first set of mask rows comprising encoded combinations of the first number, the second number, and the third number, wherein a one's complement addition of the first number and the second number perturbs all bits of the second number up to the respective bit of the second number; and
a second set of mask rows comprising encoded combinations of the second number and the third number, wherein the respective bit of the second number and the respective bit of the third number do not match.

19. The method of claim 18, wherein the control associative memory is configured such that, for each respective bit of the second number and each respective bit of the third number, the first set of mask rows has a higher priority than the second set of rows.

20. The method of claim 17, further comprising:
performing a network address translation for a destination address of the packet; and
wherein one of the plurality of updates to the packet is caused by the network address translation.

* * * * *